(12) United States Patent
Koo et al.

(10) Patent No.: US 7,400,642 B2
(45) Date of Patent: Jul. 15, 2008

(54) APPARATUS AND METHOD FOR CONTROLLING OPERATIONAL STATES OF MEDIUM ACCESS CONTROL LAYER IN A BROADBAND WIRELESS ACCESS COMMUNICATION SYSTEM

(75) Inventors: Chang-Hoi Koo, Seongnam-si (KR); Hyun-Jeong Kang, Seoul (KR); So-Hyun Kim, Suswon-si (KR); Sung-Jin Lee, Suwon-si (KR); Yeong-Moon Son, Anyang-si (KR); Jung-Je Son, Seongnam-si (KR)

(73) Assignee: Samsung Electronics Co., Ltd (KR)

(*) Notice: Subject to any disclaimer, the term of this patent is extended or adjusted under 35 U.S.C. 154(b) by 842 days.

(21) Appl. No.: 10/929,662

(22) Filed: Aug. 30, 2004

(65) Prior Publication Data
US 2005/0047429 A1   Mar. 3, 2005

(30) Foreign Application Priority Data

| Aug. 29, 2003 | (KR) | .................. 10-2003-0060289 |
| Sep. 20, 2003 | (KR) | .................. 10-2003-0065394 |
| Sep. 20, 2003 | (KR) | .................. 10-2003-0065396 |
| Sep. 20, 2003 | (KR) | .................. 10-2003-0065398 |

(51) Int. Cl.
*H04L 12/413* (2006.01)

(52) U.S. Cl. ............... 370/447; 455/432.1; 455/574

(58) Field of Classification Search .............. 370/335, 370/338, 447, 331, 332, 329, 341, 344, 345, 370/349, 461, 455, 458, 462, 395.2, 395.4, 370/395.41; 455/432.1, 426, 462.2, 574
See application file for complete search history.

(56) References Cited

U.S. PATENT DOCUMENTS

| 6,532,225 | B1 | 3/2003 | Chang et al. |
| 7,039,430 | B2* | 5/2006 | Kang et al. .................. 455/458 |
| 7,289,804 | B2* | 10/2007 | Kim ......................... 455/432.1 |
| 2003/0012167 | A1 | 1/2003 | Benveniste |
| 2003/0117969 | A1 | 6/2003 | Koo et al. |
| 2003/0174665 | A1 | 9/2003 | Benveniste |

FOREIGN PATENT DOCUMENTS

EP   0 986 212   3/2000

(Continued)

*Primary Examiner*—Chi Pham
*Assistant Examiner*—Alexander O. Boakye
(74) *Attorney, Agent, or Firm*—The Farrell Law Firm, PC

(57) ABSTRACT

Disclosed is a method for controlling an operational state of a medium access control layer in a broadband wireless access communication system. The method includes the steps of performing an uplink access of a contention-based scheme to an access point using resources required to perform the uplink access according to the contention-based scheme when data to be transmitted in an access state is detected, and being allocated resources required to perform an uplink access of a contention-free scheme from the access point in a case of failing in the uplink access of the contention-based scheme; and performing a state transition from the access state into the traffic state in a case of having been allocated the resource required for the contention-free scheme, and performing the uplink access of the contention-free scheme to the access point using the allocated resource in the traffic state.

39 Claims, 19 Drawing Sheets

FOREIGN PATENT DOCUMENTS

| | | |
|---|---|---|
| EP | 0 993 211 | 4/2000 |
| EP | 1 237 334 | 9/2002 |
| KR | 10-2002-0037427 | 5/2002 |
| RU | 2 150 176 | 11/1995 |
| RU | 2 196 392 | 3/1997 |
| RU | 2 197 792 | 8/1997 |
| WO | WO 95/32567 | 11/1995 |
| WO | WO 98/06230 | 2/1998 |
| WO | WO 01/33884 | 5/2001 |
| WO | WO 01/52564 | 7/2001 |
| WO | WO 02/17668 | 2/2002 |

* cited by examiner

APPARATUS AND METHOD FOR CONTROLLING OPERATIONAL STATES OF MEDIUM ACCESS CONTROL LAYER IN A BROADBAND WIRELESS ACCESS COMMUNICATION SYSTEM

PRIORITY

This application claims priority to applications entitled "Apparatus And Method For Controlling Operational States Of Medium Access Control Layer In Broadband Wireless Access Communication System" filed in the Korean Intellectual Property Office on Aug. 29, 2003 and assigned Serial No. 2003-60289, filed Sep. 20, 2003 and assigned Serial No. 2003-65394, filed Sep. 20, 2003 and assigned Serial No. 2003-65396, and filed Sep. 20, 2003 and assigned Serial No. 2003-65398 the contents of each of which are incorporated herein by reference.

BACKGROUND OF THE INVENTION

1. Field of the Invention

The present invention relates to a broadband wireless access communication system, and more particularly to an apparatus and a method for controlling the operational states of a medium access control layer.

2. Description of the Related Art

A 4th generation ('4G') communication system, which is a next generation communication system, is being actively designed and studied in order to provide users with services having various Qualities of Service ('QoS') at a high transmission rate. Meanwhile, a wireless local area network ('LAN') system and a wireless metropolitan area network ('MAN') system generally provide transmission speeds of about 20 Mbps to 50 Mbps. Therefore, the current 4G communication system is developing into a system that assures mobility and a QoS in the wireless LAN and MAN systems which inturn assure a relatively-high transmission speed.

In the following description, the broadband wireless access communication system will be explained with reference to FIG. 1.

FIG. 1 is a view showing a construction of a general broadband wireless access communication system.

Prior to the explanation of FIG. 1, it is noted that a wireless MAN system is a type of broadband wireless access communication system capable of providing a wider service coverage area and a higher transmission speed than that of a wireless LAN system. An IEEE (Institute of Electrical and Electronics Engineers) 802.16a communication system applies an orthogonal frequency division multiplexing (OFDM) scheme and an orthogonal frequency division multiplexing access (OFDMA) scheme to a physical channel of the wireless MAN system in order to support a broadband transmission network. Since the IEEE 802.16a communication system applies the OFDM/OFDMA scheme to the wireless MAM system, the IEEE 802.16a communication system transmits a physical channel signal by using a plurality of sub-carriers, so that it is possible to transmit high-speed data. Meanwhile, an IEEE 802.16e communication system is achieved by supplementing the above-described IEEE 802.16a communication system to enable the mobility of an access terminal (AT). However, currently, the IEEE 802.16e communication system has not been standardized in detail.

Both IEEE 802.16a and IEEE 802.16e communication systems are broadband wireless access communication systems using the OFDM/OFDMA scheme. For the convenience of explanation, only the IEEE 802.16a communication system will be described below as an example. The IEEE 802.16a and IEEE 802.16e communication systems can use either the OFDM/OFDMA scheme or a single carrier (SC) scheme, but the following description will be given in consideration of only the OFDM/OFDMA scheme.

Referring to FIG. 1, the IEEE 802.16a communication system has a single cell structure and includes an access point (AP) 100 and a plurality of access terminals 110, 120, and 130 which are managed by the access point 100. The access point 100 conducts signal communications with the access terminals 110, 120, and 130 by using the OFDM/OFDMA scheme.

The wireless MAN system is suitable for high-speed communication services because it has a wide service coverage area and provides a high transmission speed. However, since the wireless MAN system does not take into consideration the user's mobility, that is the mobility of an access terminal, handoff according to high-speed mobility of the access terminal is also not taken into consideration in the wireless MAN system. It is therefore necessary to develop a definite operation scheme of a medium access control ('MAC') layer which minimize power consumption of an access terminal moving at a high speed and supports an operation for a high-speed packet data transmission between the access terminal and an access point.

SUMMARY OF THE INVENTION

Accordingly, the present invention has been made to solve at least the above-mentioned problems occurring in the prior art, and an object of the present invention is to provide an apparatus and a method for controlling the operational states of a medium access control (MAC) layer in a broadband wireless access communication system.

Another object of the present invention is to provide an apparatus and a method for controlling the operational states of a medium access control the MAC layer so as to minimize the power consumption of an access terminal in a broadband wireless access communication system.

Still another object of the present invention is to provide an apparatus and a method for controlling the operational states of a medium access control (MAC) layer so as to support an uplink access according to the grade of service in a broadband wireless access communication system.

Still another object of the present invention is to provide an apparatus and a method for controlling the operational states of a medium access control (MAC) layer so as to support a fast access in a broadband wireless access communication system.

In accordance with one aspect of the present invention, there is provided an apparatus for transmitting a wake-up channel in a broadband wireless access communication system. The apparatus comprises a symbol repeater for receiving wake-up indicators, a number of frames constructing a super frame of a wake-up channel, and a frame period, the wake-up indicators representing whether or not access terminals in a sleeping mode of a sleeping state wake up, the wake-up channel including the wake-up indicators, the frame period representing a period in which the wake-up indicators are transmitted in the super frame, and for repeating a symbol of the wake-up indicators according to a transmission format of the wake-up channel; a wake-up channel information mapper for receiving slot index information according to a predetermined control and on/off setting information of the wake-up indicator, and for setting the wake-up indicators, which exists in slots corresponding to the slot index information, from among signals output from the symbol repeater, according to the on/off setting information; and a controller for determining access terminals to which data or updated system information is transmitted when there is data to be transmitted or when the system information is updated, and for outputting slot index information and first setting information to the wake-up channel information mapper, the slot index information monitored by the determined access terminals, the first information representing that wake-up indicators corresponding to the slot index information have to be set to 'on'.

In accordance with another aspect of the present invention, there is provided a method for controlling an operational state of a medium access control layer in a broadband wireless access communication system. The method comprising the steps of performing an uplink access of a contention-based scheme to an access point using resources required to perform the uplink access according to the contention-based scheme when data to be transmitted is detected in an access state; receiving resources required to perform an uplink access of a contention-free scheme from the access point in a case of failing in the uplink access of the contention-based scheme; and performing a state transition from the access state into a traffic state in a case of receiving the resources required to perform the uplink access of the contention-free scheme, and performing the uplink access of the contention-free scheme to the access point using the received resources in the traffic state.

In accordance with still another aspect of the present invention, there is provided a method for controlling an operational state of a medium access control layer in a broadband wireless access communication system, the medium access control layer having a null state for performing an initial operation following a reset, an initialization state for acquiring synchronization with an access point and performing a network entry operation to the access point, a sleeping state for performing a wake-up operation by a control of the access point or when there is data to be transmitted to the access point, an access state for performing an uplink access of a contention-free scheme to the access point, and a traffic state for transmitting data to the access point or receiving data from the access point. The method comprises the steps of allocating codes by the access point for uplink access of a contention-based scheme and allocating codes by the access point for the uplink access of the contention-free scheme according to QoS (Quality of Service) classes; selecting a first code by an access terminal, according to the QoS classes of data to be transmitted from among the allocated codes for the uplink access of the contention-based scheme, when the data to be transmitted through an uplink in the access state is generated, and performing an uplink access of the contention-based scheme to the access point using the first code; allocating by the access point a second code, from among the codes for uplink access of the contention-free scheme, to the access terminal so that the access terminal can perform an uplink access of the contention-free scheme, when it fails to allocate the access terminal a resource for data transmission of the access terminal in response to the uplink access performed by the access terminal; and performing by the access terminal a state transition from the access state into the traffic state when allocated the second code, and performing an uplink access of the contention-free scheme to the access point using the second code in the traffic state.

In accordance with still another aspect of the present invention, there is provided a method for controlling an operational state of a medium access control layer in a broadband wireless access communication system. The method comprising the steps of acquiring synchronization with an access point to which an access terminal belongs in a system detecting mode of an initialization state, performing a mode change from the system detecting mode into a network entry mode, and performing a network entry operation to the access point in the network entry mode; entering a sleeping mode of a sleeping state from the network entry mode when there is no data to be transmitted to the access point or received from the access point, entering an access state from the network entry mode when there is data to be transmitted to the access point, and entering a traffic state from the network entry mode when there is data to be received from the access point, after performing the network entry operation; entering an awake mode of the sleeping state when there is data to be transmitted to the access point or when a wake-up is requested from the access point in the sleeping state, and entering the access state from the awake mode when there is data to be transmitted to the access point; and receiving predetermined information from the access point in the awake mode, and entering either the sleeping mode or the traffic state from the awake mode according to the predetermined information.

In accordance with still another aspect of the present invention, there is provided a method for controlling an operational state of a medium access control layer in a broadband wireless access communication system. The method comprising the steps of transmitting by an access point a pilot channel signal and a broadcast channel signal, the pilot channel signal being used for synchronization acquisition with an access terminal, the broadcast channel signal including system information of the broadband wireless access communication system; acquiring by the access terminal synchronization with the access point, to which the access terminal itself belongs, using the pilot channel signal in a system detecting mode of an initialization state, and entering a network entry mode; receiving by the access terminal the broadcast channel signal and transmitting a network entry request message to the access point in the network entry mode; transmitting by the access point a network entry response message to the access terminal in response to the network entry request message, the network entry response message including slot index information of a wake-up channel which the access terminal monitors in the sleeping mode of the sleeping state; and receiving by the access terminal the network entry response message, and entering the sleeping mode when there is no data to be transmitted to the access point or received from the access point, thereby monitoring a wake-up indicator of the wake-up channel corresponding to the slot index information.

In accordance with still another aspect of the present invention, there is provided a method for transmitting a wake-up channel in a broadband wireless access communication system. The method comprising the steps of: receiving wake-up indicators, a number of frames constructing a super frame of a wake-up channel, and a frame period, the wake-up indicators representing whether or not access terminals in a sleeping mode of a sleeping state wake up, the wake-up channel including the wake-up indicators, the frame period representing a period in which the wake-up indicators are transmitted in the super frame, and repeating a symbol of the wake-up indicators according to a transmission format of the wake-up channel; determining access terminals to which data or updated system information is transmitted when there is the data to be transmitted or when the system information is updated, and determining slot index information which the determined access terminals monitor; and setting wake-up indicators corresponding to the determined slot index information to 'on', and transmitting the wake-up channel signal.

In accordance with still another aspect of the present invention, there is provided a method for controlling an operational state of a medium access control layer in a broadband wireless access communication system. The method comprising the steps of entering an active mode of a traffic state, when there is data to be received from an access point in one of an initialization state and in a sleeping state, or when an uplink bandwidth is allocated according to uplink access performance of a contention-based scheme in an access state; entering a hold mode when data transmission to the access point or data reception from the access point is interrupted for a predetermined period of time during data transmission to the access point or data reception from the access point while in an active mode; receiving a predetermined channel signal in the hold mode so as to monitor whether or not a wake-up request is generated from the access point, entering the active mode when a wake-up request is generated from the access point, and entering the fast access mode when data to be transmitted to the access point is generated in the hold mode; and performing an uplink access of a contention-free scheme to the access point in the fast access mode using resources for the uplink access of the contention-free scheme, and entering the active mode when being allocated the uplink bandwidth as a result of the uplink access performance of the contention-free scheme.

In accordance with still another aspect of the present invention, there is provided a method for controlling an operational state of a traffic state in a broadband wireless access communication system. The method comprising the steps of: 1) transmitting data to an access point or receiving data from an access point by an access terminal in an active mode; 2) requesting the access terminal to perform a mode change from the active mode into a hold mode by the access point, when the data transmission to the access terminal or data reception from the access terminal, which is in the active mode, is interrupted during a predetermined period of time; 3) entering the hold mode by the access terminal after transmitting a response to the access point in response to the mode change request of step 2), receiving a set channel signal, which is monitored to determine if a wake-up request is generated from the access point, entering the active mode when a wake-up request is generated from the access point, and entering a fast access mode when data to be transmitted to the access point are generated in the hold mode; 4) requesting by the access terminal in the fast access mode that a mode of the access terminal is changed from the fast access mode into active mode using a resource for uplink access of a contention-free scheme; and 5) transmitting a response to the access terminal by the access point in response to a mode change request of step 4), thereby causing the access terminal to perform a mode change from the fast access mode into the active mode and to transmit the data to the access point.

In accordance with still another aspect of the present invention, there is provided a method for controlling an operational state of a traffic state in a broadband wireless access communication system. The method comprises the steps of: 1) requesting by an access terminal an access point that a mode of the access terminal itself is changed from an active mode into a hold mode when data transmission or data reception is interrupted for a predetermined period of time during the data transmission/reception to/from the access point while in the active mode; 2) transmitting by the access point a response to a mode change request of step 1) to the access terminal, thereby causing the access terminal to enter the hold mode; 3) requesting by the access point the access terminal to change a mode of the access terminal from the hold mode into the active mode when detecting that data to be transmitted to the access terminal being in the hold mode are generated; and 4) performing by the access terminal a mode change from the hold mode into the active mode according to a mode change request of step 3), thereby receiving the data from access point.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
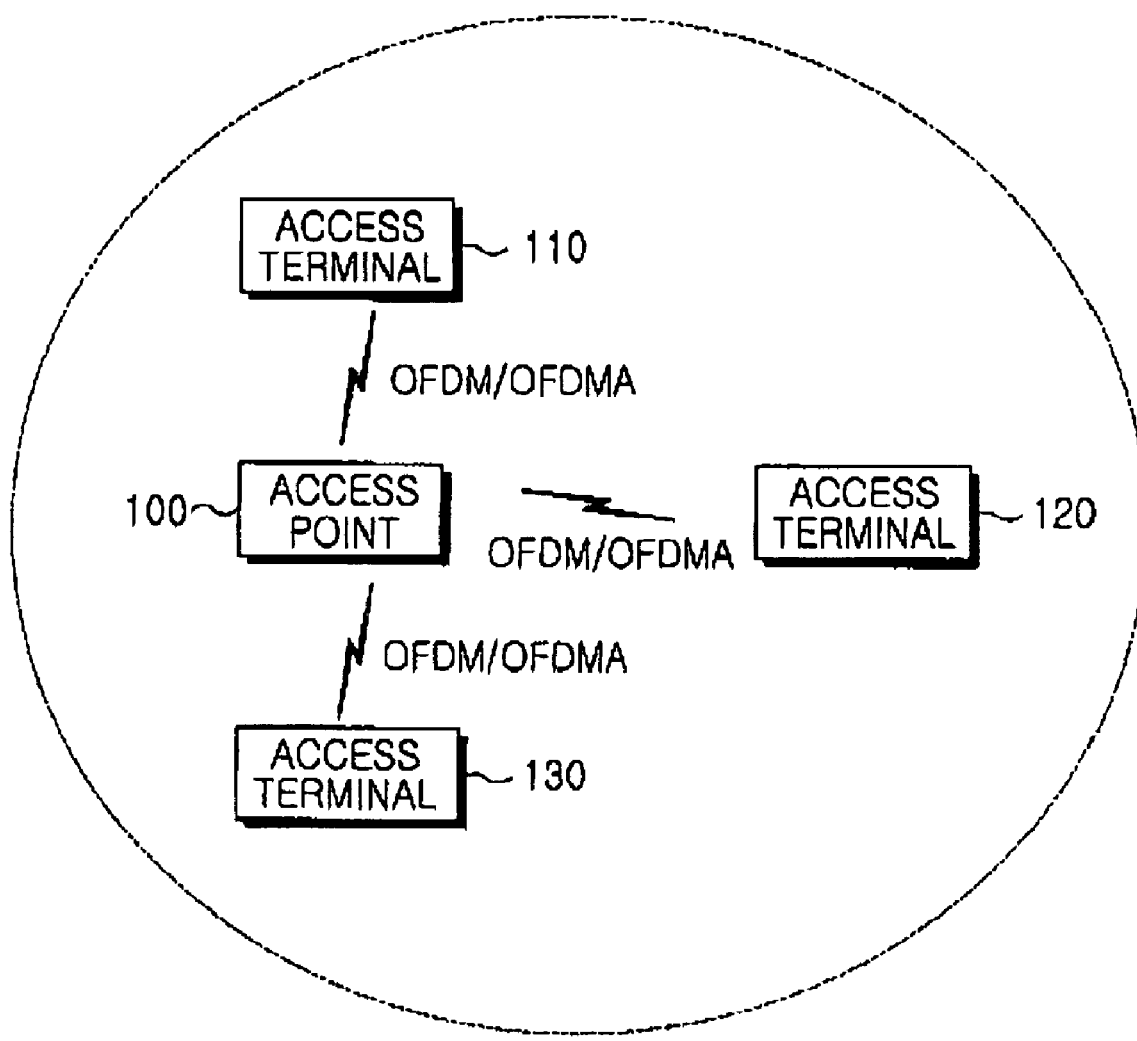
FIG. 1 is a structure diagram schematically illustrating a construction of a general broadband wireless access communication system.

Hereinafter, preferred embodiments of an apparatus and a method for controlling operational states of a medium access control (MAC) layer in a broadband wireless access communication system according to the present invention will be described with reference to the accompanying drawings. In the following description of the present invention, a detailed description of known functions and configurations incorporated herein will be omitted when it may obscure the subject matter of the present invention.

The present invention proposes a scheme for controlling the operational states of the MAC' layer in the broadband wireless access communication system. Particularly, the control scheme for the operational states of the MAC layer, which is proposed in the present invention, supports the mobility of an access terminal (AT), and enables a fast access while minimizing the power consumption of the access terminal.

First, in order to support the operational states of the MAC layer, the present invention proposes new downlink channels and new uplink channels, and the newly proposed downlink channels and uplink channels will be described with reference to Table 1.

TABLE 1

| Name of Channel | Purpose of Transmission | Kind of Channel |
| --- | --- | --- |
| pilot channel (DL-PICH) | cell identification, synchronization acquisition | common channel |
| broadcast channel (DL-BCCH) | transmission of system information | common channel |
| scheduling channel (DL-USCCH) | transmission of UL-TCH scheduling information, transmission of uplink transmission control information | common channel |
| traffic channel (DL-TCH) | burst traffic channel (burst traffic data transmission) | share in a time/frequency shared scheme |
|  | dedicated traffic channel (fixed allocation) | fixed allocation |
|  | signaling channel (transmission of signaling message) | dedicated channel |
| traffic control channel (DL-TCCH) | transmission of control information about DL-TCH | common channel |
| wake up channel (DL-WUCH) | transmission of wake-up indicator | common channel |

A description will be given for each of downlink channels shown in Table 1.

(1) Pilot Channel ('DL-PICH')

The DL-PICH is a channel for cell identification and for the synchronization acquisition between an access point (AP) and an access terminal. The access point may manage either a plurality of cells or only one cell, but, in the following description, it is assumed for the convenience of explanation that one access point manages only one cell. Therefore, it should be noted that the term "cell" will be used as having the same meaning as that of the term "access point". The access terminal receives the DL-PICH signals transmitted from a plurality of access points after being powered on, and determines which access point transmits a DL-PICH signal of the greatest power level, for example a DL-PICH signal having the greatest carrier-to-interference-and-noise ratio ('CINR'), from among the received DL-PICH signals as the access point to which the access terminal belongs. In the following description about downlink channels, it should be noted that the acronym 'DL' is commonly used to represent 'downlink channel'.

(2) Broadcast Channel ('DL-BCCH')

The DL-BCCH is a channel for transmitting the system configuration information related to the broadband wireless access communication system, neighbor cell information, the downlink and uplink channel configuration information, the downlink and uplink access information, the paging information representing that there is a call to a specific access terminal, the slot index information of a wake-up channel ('DL-WUCH'). An access terminal has to monitor the DL-WUCH so as to perform a mode shifting operation from a sleeping mode of a sleeping state to an awake mode, etc.

The sleeping mode is a mode for minimizing the power consumption in such a manner that the access terminal monitors only the DL-WUCH and then monitors the DL-BCCH only when the wake-up indicator of the DL-WUCH allocated into the access terminal itself is turned on. The awake mode is a mode in which the access terminal monitors a DL-BCCH, which is transmitted from the access point, to determine whether or not the system information is updated or paging information is received. The detailed operations of the sleeping mode and the awake mode have no direct connection with the present invention, and the detailed description of them will be omitted herein. When the system configuration information, the downlink and uplink channel configuration information, the downlink and uplink access information, and the like are changed, the access point updates the changed information and periodically transmits the updated information to an access terminal through the DL-BCCH. In addition, a response to the uplink access is also transmitted through the DL-BCCH. The DL-BCCH is established as a super frame unit, and the information is periodically and repeatedly transmitted in a super frame unit. Herein the super frame includes a predetermined number of frames.

When the access point determines that a slot index of a DL-WUCH, which an access terminal monitors to perform a mode shifting operation from a sleeping mode of a sleeping state to an awake mode, the access point allocates a particular slot index of the DL-WUCH to each of the access terminals managed by the access point, and maintains the allocated slot index of the DL-WUCH until the access terminal is handed off to a new access point. The number of slot indexes of the DL-WUCH to be allocated by the access point may change depending on the configuration of the DL-WUCH, and the present invention does not involve the configuration of the DL-WUCH, so the detailed description of that will be omitted herein.

(3) Downlink-Uplink Scheduling Channel ('DL-USCCH')

The DL-USCCH is a channel which transmits the scheduling information for the transmission of an uplink traffic channel ('UL-TCH') and control information related to an uplink, such as an adaptive-modulation-and-coding ('AMC') scheme. Particularly, through the DL-USCCH, a bandwidth allocation response message is transmitted in response to a bandwidth allocation request message. When it is necessary for the access terminal to transmit traffic through an uplink, the access terminal transmits a bandwidth allocation request message for the uplink traffic transmission to the access point through an uplink access channel ('UL-ACH'), and monitors whether or not a bandwidth allocation response message, which is a response message to the bandwidth allocation request message, is received from the access point through the DL-USCCH. When receiving a bandwidth allocation response message through the DL-USCCH, the access terminal transmits the traffic through an uplink according to the control information included in the bandwidth allocation response message.

When the access terminal performs a connection establishment operation for traffic transmission to an access point, if there is a predetermined convention, the access point may continuously allocate a predetermined bandwidth to the access terminal although the access terminal does not transmit an additional bandwidth allocation request message through an uplink. The access terminal may transmit traffic data through the allocated bandwidth, and may transmit a bandwidth allocation request message for data to be transmitted through the UL-TCH in a contention-free scheme method. Then, the access terminal determine the allocation information of an uplink by monitoring the DL-USCCH. In order to transmit traffic data to the access point through the UL-TCH, the access terminal must also continuously monitor the DL-USCCH to monitor for information about bandwidth allocation performed by the access point.

(4) Traffic Channel ('DL-TCH')

The DL-TCH is a channel for transmitting the actual packet data. According to the characteristics of packet data to be transmitted, three logical channels may be mapped in the DL-TCH as described below.

a. Burst Traffic Channel

The burst traffic channel is a logical channel for transmitting burst traffic, in which the burst traffic is transmitted in a time-shared scheme that provides a burst-based dynamic allocation scheme based on a dynamic scheduling scheme. A description will be given for service classes, that is the Qualities of Service ('QoS'), of the broadband wireless access communication system with reference to Table 2.

TABLE 2

| Service of Class (QoS) | Description |
| --- | --- |
| Unsolicited Granted Service (UGS) | Service which needs the same bandwidth to be continuously allocated while maintaining a connection such as a VoIP (Voice over Internet Protocol) service, a real time voice transmission service |
| Real Time Service | Have the characteristics of a real time service like a UGS, but causes variable bandwidth allocation because the amount of generated data is different depending on the frames, and conforms to video transmission |
| Non Real Time Service | Data service having no real time service characteristics, does not have a burst characteristic like the best effort service, conforms to a FTP (File Transfer Protocol) |
| Best Effort Service | Service having a burst characteristic, conforms to WEB services and the like, service of the lowest class, has an allocation of bandwidth in a non-assured form, allocates bandwidth only for each request |

Through the burst traffic channel, the real-time service data are scheduled to be transmitted, the non-real-time service data are transmitted, or the best effect service data are transmitted.

b. Dedicated Traffic Channel

The dedicated traffic channel is a channel for allocating a fixed minimum bandwidth. Data, such the (UGS data, to which a minimum bandwidth is continuously allocated are transmitted through the dedicated traffic channel.

c. Signaling Channel

The signaling channel is a channel for transmitting a signaling message which is control information.

(5) Traffic Control Channel ('DL-TCCH')

The DL-TCCH is a channel for transmitting the control information for an access terminal to efficiently process the data transmitted through the DL-TCH, that is the control information related to the DL-TCH. The DL-TCCH is always transmitted in connection with the DL-TCH. The control information transmitted through the DL-TCH includes AMC scheme information applied to the data transmitted through the DL-TCH, information used in the data decoding such as encoded packet size ('EP') information, an MAC control message, etc. Also, the access point may feedback AMC scheme information related to the packet data, which is transmitted through an uplink, to the access terminal through the DL-TCCH.

(6) Wake Up Channel ('DL-WUCH')

The DL-WUCH, which is a channel for minimizing the power consumption of an access terminal, is monitored by the access terminal in a sleeping mode of a sleeping state. A wake-up indicator exists in a specific part of the DL-WUCH, the access terminal performs a mode shifting operation from the sleeping mode to an awake mode according to whether the wake-up indicator is turned on or off. That the wake-up indicator is turned on represents that the value of the wake-up indicator is set to a first value, for example, 'one', and in contrast, that the wake-up indicator is turned off represents that the value of wake-up indicator is set to a second value, for example, 'zero'. Also, the DL-WUCH is transmitted as a super frame unit like the DL-BCCH.

The above description with reference to Table 2 has defined the downlink channels proposed in the present invention. The uplink channels proposed in the present invention will be described with reference to Table 3.

TABLE 3

| Name of Channel | Purpose of transmission | Kind of Channel |
| --- | --- | --- |
| Access Channel (UL-ACH) | Uplink access of contention-based scheme | common channel |
| | Uplink access of contention-free scheme | common channel |
| Traffic Channel (UL-TCH) | Burst traffic channel (transmission of burst traffic data) | share in time-shared scheme |
| | Dedicated traffic channel (fixed allocation) | fixed allocation |
| | Signaling channel (transmission of signaling message) | dedicated channel |

Each uplink channel shown in Table 3 will now be described.

(1) Access Channel ('UL-ACH')

The UL-ACH is a channel used by an access terminal when the access terminal transmits a bandwidth allocation request signal to request a bandwidth allocation, for the purpose of data transmission through an uplink, that is, for the purpose of uplink access. According to the grade of the access terminal or the characteristics of data to be transmitted through the uplink, two logical channels as described below may be mapped to the UL-ACH.

a. Access Channel

The access channel is a channel for uplink access of a contention-based scheme, and is used when the access terminal enters a network or when the access terminal requests a bandwidth allocation. Through the access channel, a very small amount of data, such as a TCP (Transmission Control Protocol) ACK/NACK signal, may be transmitted together with an uplink access request signal (access preamble+packet data).

b. Fast Access Channel

The fast access channel is a channel for the uplink access of a contention-free scheme. An orthogonal code, such as a pseudorandom noise (PN) code, or a time slot position, which is used for the uplink access, is allocated to an access terminal from an access point. Then, the access terminal performs the uplink access through the fast access channel using the orthogonal code or the time slot position allocated from the access point. In the following description, a PN code which is used for the uplink access through the UL-FACCH, that is, for fast access, is called a 'fast access PN code', and a time slot used for the fast access is called a 'fast access time slot'. The fast access PN code and the fast access time slot will be described later in detail.

(2) Traffic Channel ('UL-TCH')

The UL-TCH is a channel used when an access terminal transmits data to an access point. According to the characteristics of the data transmitted through the UL-TCH, three logical channels may be mapped in the UL-TCH as described above. Herein, the traffic channel is also included to the downlink channels as described above. For convenience of description, the traffic channel of an uplink is called an 'UL-TCH'.

a. Burst Traffic Channel

The burst traffic channel has the same function as that of the burst traffic channel mapped to the DL-TCH, and has only one difference in that the burst traffic channel is mapped not to the DL-TCH but to the UL-TCH, and so, a detailed description thereof will be omitted.

b. Dedicated Traffic Channel

The dedicated traffic channel has the same function as that of the dedicated traffic channel mapped to the DL-TCH, and has only one difference in that the dedicated traffic channel is mapped not to the DL-TCH but in the UL-TCH, and so, a detailed description thereof will be omitted.

c. Signaling Channel

The signaling channel has the same function as that of the signaling channel mapped to the DL-TCH, and has only one difference in that the signaling channel is mapped not to the DL-TCH but to the UL-TCH, and so, a detailed description thereof will be omitted.

Hereinafter, a description will be given for the MAC operational states for performing the actual operations, with reference to FIG. 2, using the newly proposed downlink and uplink channels in the present invention as described in Tables 1 and 3.

Figure 2:
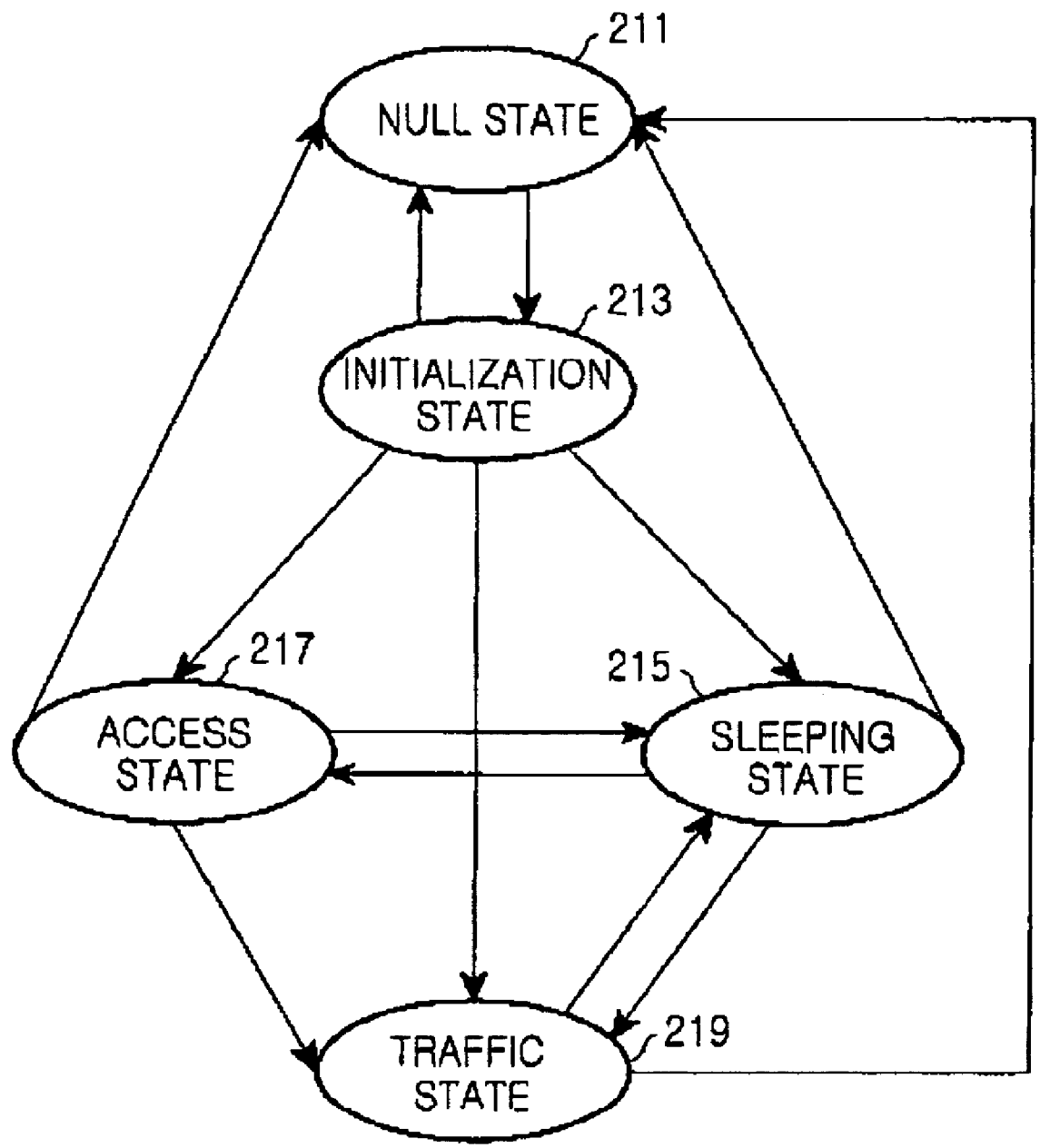
FIG. 2 is a state diagram schematically illustrating operational states supported by a MAC layer in a broadband wireless access communication system according to an embodiment of the present invention.

FIG. 2 is a state diagram showing the operational states supported by a MAC layer in a broadband wireless access communication system according to an embodiment of the present invention.

Referring to FIG. 2, the MAC layer of the broadband wireless access communication system proposed in the present invention supports five types of operational states, that is, a null state 211, an initialization state 213, a sleeping state 215, an access state 217, and a traffic state 219. The operational states of the MAC layer proposed in the present invention supports the mobility of an access terminal (AT), and enables the fast access while minimizing the power consumption of the access terminal.

Each of the operational states of the MAC layer will now be described.

First, a description will be given for the null state 211. The null state 211 is a state to perform an initial operation, when an access terminal is powered on, or when the access terminal is reset by an abnormal operation. It is possible that the state transition can be performed from each of the initialization state 213, the sleeping state 215, the access state 217, and the traffic state 219, into the null state 211. As described above, when the access terminal normally performs an initial operation following a reset or power-on of the access terminal, the access terminal performs a state transition from the null state 211 into the initialization state 213.

Secondly, a description will be given for the initialization state 213. In the initialization state 213, when having normally completed an initial operation following a reset or power-on, the access terminal performs a synchronization acquisition operation with an access point. In order to perform a synchronization acquisition operation with the access point, the access terminal monitors all frequency bands, which are predetermined in the access terminal, and detects a DL-PICH signal having the greatest intensity, that is, having the greatest CINR. When the access terminal is handed off from a cell in which the access terminal itself exists, that is, from a prior access point, to a new cell, that is, to a target access point, the access terminal also performs a synchronization acquisition operation with the target access point in the initialization state 213. In an IEEE (Institute of Electrical and Electronics Engineers) 802.16a communication system, which is a typical broadband wireless access communication system, since the mobility of the access terminal is not considered, it is enough to consider only the case in which the access terminal is powered on or is reset. In contrast, in a broadband wireless access communication system that considers the mobility of the access terminal, such as an IEEE 802.16e communication system, since the mobility of the access terminal is considered, not only the case in which the access terminal is powered on or is reset but also the case in which the access terminal is handed off has to be considered. Therefore, an apparatus and a method of the present invention is constructed taking into consideration not only the case in which the access terminal is powered on or is reset, but also the case in which the access terminal is handed off. That is, the access terminal has to continuously monitor whether or not there is a second access point which transmits a DL-PICH signal having a greater CINR than that of a DL-PICH signal transmitted from a first access point to which the access terminal currently belongs, by considering a hand-off state. Under a continuous monitoring operation, when there is a second access point which transmits a DL-PICH signal having a greater CINR than that of a DL-PICH signal transmitted from a first access point to which the access terminal currently belongs, the access terminal performs a cell reselection operation.

The access terminal, which has acquired synchronization with the access point, receives a DL-BCCH signal transmitted from the access point to receive the system information (SI). Next, the access terminal performs a network entry operation for the registration and the authentication to the access point to perform an operation for transmitting/receiving normal packet data to/from the access point, and then performs a state transition into the sleeping state 215, the access state 217, or the traffic state 219. The system information includes system configuration information, neighbor access point information, downlink and uplink channel configuration information, and downlink and uplink access information.

In the initialization state 213, when the access terminal loses its synchronization with the access point due to a problem, such as a system error, the access terminal performs a state transition from the initialization state 213 into the null state 211, thereby performing an initial operation again. That is, when the access terminal is reset due to a problem, such as a system error, it is necessary that the access terminal starts its operation in the null state 211. The access terminal also performs a state transition from the initialization state 213 into the traffic state 219 when the access terminal receives paging information to represent that there is data transmitted from the access terminal to the access point after performing a network entry operation for the registration and the authentication to the access point.

The operation of an access terminal in the initialization state 213 will be simplified as follows.

(1) DL-PICH Monitoring and Synchronization Acquisition with the Access Point (2) DL-BCCH Monitoring Operation Receiving system configuration information, neighbor access point information, downlink and uplink channel configuration information, and downlink and uplink access information, paging information representing that there is a call to an access terminal, and slot index information of a DL-WUCH which an access terminal has to monitor to perform a mode shifting operation from a sleeping mode to an awake mode.

(3) Network Entry Operation for the Registration and the Authentication to the Access Point In the network entry operation, the access terminal uses the UL-ACH when performing an uplink access to an access point. A response signal to the uplink access, which relates to a network entry operation and is performed through the UL-ACH, is received through the DL-BCCH.

Thirdly, a description will be given for the sleeping state 215. The case in which the access terminal performs a state transition from the initialization state 213 into the sleeping state 215 occurs when the access terminal has no data to be transmitted/received to/from an access point after performing a network entry operation in the initialization state 213. That is, after the access terminal performs a network entry operation in the initialization state 213, if there is no data transmitted/received between the access terminal and the access point, the access terminal performs a state transition into the sleeping state 215 so as to minimize power consumption.

In the sleeping state 215, the access terminal wakes up according to the control of the access point, and the access point notifies the access terminal to wake-up as instructed through the wake-up indicator of the DL-WUCH. That is, when the wake-up indicator of the DL-WUCH is turned on, the access terminal wakes up. The access terminal can recognizes a slot index of a position into which an indicator of the DL-WUCH is inserted, through the DL-BCCH in the initialization state 213. One access point allocates a particular slot index of a position, into which an indicator of the DL-WUCH is inserted, as described above, into each of the access terminals, and the allocated slot index of the DL-WUCH is maintained until the access terminal is handed off to a new access point. In the sleeping state 215, the access terminal does not continuously monitor the DL-BCCH so as to minimize the power consumption but monitors only the DL-WUCH. Then, the access terminal wakes up to monitor the DL-BCCH only when the wake-up indicator of the DL-WUCH is turned on, thereby minimizing the power consumption. Also, while the access terminal is monitoring the DL-BCCH, the access terminal does not monitor the DL-WUCH.

Also, while monitoring the DL-BCCH in the sleeping state 215, if the access terminal receives information representing that there is a paging to be received by the access terminal, the access terminal performs a state transition from the sleeping state 215 into the traffic state 219, to receive the data from the access point. In the sleeping state 215, when the access terminal loses its synchronization with the access point due to a problem, such as a system error, the access terminal performs a state transition from the sleeping state 215 into the null state 211, thereby performing an initial operation again. That is, when the access terminal is reset due to a problem, such as a system error, it is necessary that the access terminal restart its operation in the null state 211.

Fourthly, a description will be given for the access state 217. The case in which the access terminal performs a state transition from the initialization state 213 into the access state 217 occurs when the access terminal has data to be transmitted/received to/from an access point after performing a network entry operation in the initialization state 213. After the access terminal performs a network entry operation in the initialization state 213, if there is data to be transmitted/received between the access terminal and the access point, the access terminal performs a state transition into the access state 217 so as to access the access point.

In the access state 217, the access terminal performs an access operation to the access point. The access to the access point, which is performed in the access state 217, is basically carried out in a contention-based scheme. The access terminal requests bandwidth allocation to the access point so as to transmit data, that is, traffic, to the access point. The access to an access point, that is, uplink access, of a contention-based scheme is performed using the UL-ACH.

In an embodiment of the present invention, the access point allocates different numbers of PN codes to the uplink access depending on the QoS of the traffic in response to a bandwidth allocation request. Each of the PN codes has an orthogonal feature. In the broadband wireless access communication system, a PN code is created by segmenting a PN sequence having a predetermined length, for example, '$2^{15}-1$' bits, in predetermined units. When it is assumed that P PN codes are generated by the above-mentioned scheme, from among the P PN codes, K PN codes are allocated to be used to a bandwidth allocation request for the UGS data transmission, L PN codes are allocated to be used to a bandwidth allocation request for the real time service data transmission, M PN codes are allocated to be used to a bandwidth allocation request for the non-real time service data transmission, N PN codes are allocated to be used to a bandwidth allocation request for the best effort data transmission, and S PN codes are allocated to be used for the fast access. Herein, the PN code allocated for the fast access is called a 'fast access PN code', and the relationship of P, K, L, M, N, and S may be defined as Equation 1.

$$P=K+L+M+N+S(\text{wherein, } K>L>M>N) \quad (1)$$

For example, it is assumed that the number of PN codes capable of being used for the bandwidth allocation request is 48 in the broadband wireless access communication system. Then, the access point allocates 17 PN codes from among the 48 PN codes to be used to a bandwidth allocation request for the UGS data transmission, allocates 13 PN codes from among the remaining PN codes to be used to a bandwidth allocation request for the real time service data transmission, allocates 7 PN codes from among the remaining PN codes to be used to a bandwidth allocation request for the non-real time service data transmission, allocates 4 PN codes from among the remaining PN codes to be used to a bandwidth allocation request for the best effort data transmission, and allocates the remaining PN codes to be used as the fast access PN codes.

The access point allocates more PN codes to a bandwidth allocation request for uplink data having a high priority QoS class, as compared with a low priority QoS class, thereby enabling the data having the high priority QoS class to be processed prior to the data having a lower priority QoS class. The fast access can then be achieved, so that it is also possible to minimize the power consumption of an access terminal when the access terminal performs uplink access. While a description is given above for the case in which the access point allocates fast access PN codes for fast access, the access point may allocate separate fast access time slots for fast access. The fast access, the fast access PN code, and the fast access time slot will be described in detail later.

The access terminal attempts an uplink access by transmitting the bandwidth allocation request message through the UL-ACH. When transmitting the bandwidth allocation request message, the access terminal uses only PN codes which are allocated according to the QoS of the data to be transmitted, thereby enabling an access priority to be provided according to the QoS. In this case, the access point can determine which of the QoS classes corresponds to a PN code employed for the bandwidth allocation request message. The access point allocates the fast access PN code only to a higher priority QoS class from among the QoS classes, for example, only to a UGS and a real time service. That is, when there is no uplink bandwidth to be allocated, data corresponding to a lower priority QoS class are denied the uplink access, and are required to undergo a normal uplink resumption process, that is, to undergo an uplink access resumption process of a contention-based scheme. In contrast, data corresponding to a higher priority QoS class, when there is no uplink bandwidth to be allocated, are processed to accomplish the uplink access by including the fast access PN code information, provided that the access terminal performs a state transition into the traffic state 219 and the actual data is transmitted later when there is an uplink bandwidth to be allocated. In this case, as described above, the fast access time slots may be used instead of the fast access PN codes.

According to a bandwidth allocation request of the access terminal, the access point allocates a bandwidth to be used by the access terminal into the access terminal when there is a currently available bandwidth, and notifies the access terminal of the allocated bandwidth information. Of course, as described above, in a case in which the bandwidth allocation for the data corresponding to a higher priority QoS class is requested in a state in which there is no bandwidth to be allocated, the access point must notify the access terminal of fast access PN code information. The access point transmits the allocated bandwidth information or fast access PN code information to the access terminal through the DL-USCCH.

The access terminal, which has determined that the bandwidth is allocated, performs a state transition from the access state 217 into the traffic state 219. In contrast, when the access terminal does not receive a bandwidth allocation from the access point in spite of the request of bandwidth, that is, when the access terminal fails to access the access point, the access terminal performs a state transition from the access state 217 to the sleeping state 215. When the allocation of bandwidth fails, the access terminal may again request a bandwidth allocation, and the access terminal performs a state transition from the access state 217 into the sleeping state 215 only when the bandwidth allocation is not accomplished during a predetermined period of time. Of course, when access terminal cancels the data transmission, as well as when the access terminal fails to access the access point, the access terminal performs a state transition from the access state 217 to the sleeping state 215.

When the access terminal performs a state transition from the access state 217 to the sleeping state 215, the access terminal monitors a DL-WUCH indicator in the same slot index as that of a DL-WUCH monitored before in the sleeping state 215. However, when the access terminal performs a state transition from the access state 217 to the sleeping state 215, it is possible that the access terminal does not monitor the DL-WUCH but monitors only the DL-BCCH.

Meanwhile, while the access terminal is performing the uplink access in the access state 217, if the access terminal loses synchronization with the access point due to a problem, such as a system error, the access terminal performs a state transition from the access state 217 into the null state 211, thereby performing an initial operation again. That is, when the access terminal is reset due to a problem, such as a system error, it is necessary that the access terminal restart its operation in the null state 211.

Fifthly, a description will be given for the traffic state 219. In the traffic state 219, the access terminal transmits/receives data to/from the access point. Also, in the traffic state 219, although the access terminal does not directly transmit/receive actual data to/from the access point, the access terminal is allocated resources for a later transmission/reception of data. That is, in the traffic state 219, since resources have been allocated for the transmission/reception of the data although there in no actual data to be transmitted/received between the access terminal and the access point, the access terminal can rapidly access the access point when data to be transmitted/received is generated, and the data can be normally transmitted/received. Uplink access using the fast access PN code or fast access time slot is performed in the traffic state 219.

In the traffic state 219, when there is no data to be transmitted/received between the access terminal and the access point, or when it is needed to reduce the power consumption of the access terminal itself, the access terminal performs a state transition from the traffic state 219 to the sleeping state 215. Also, in the traffic state 219, when the access terminal loses synchronization with the access point due to a problem, such as a system error, the access terminal performs a state transition from the traffic state 219 into the null state 211, thereby performing an initial operation again. When the access terminal is reset due to a problem, such as a system error, it is necessary for the access terminal restart its operation in the null state 211.

The above description with reference to FIG. 2 has shown MAC operational states proposed in the present invention. Hereinafter, the initialization state 213 will be described with reference to FIG. 3.

Figure 3:
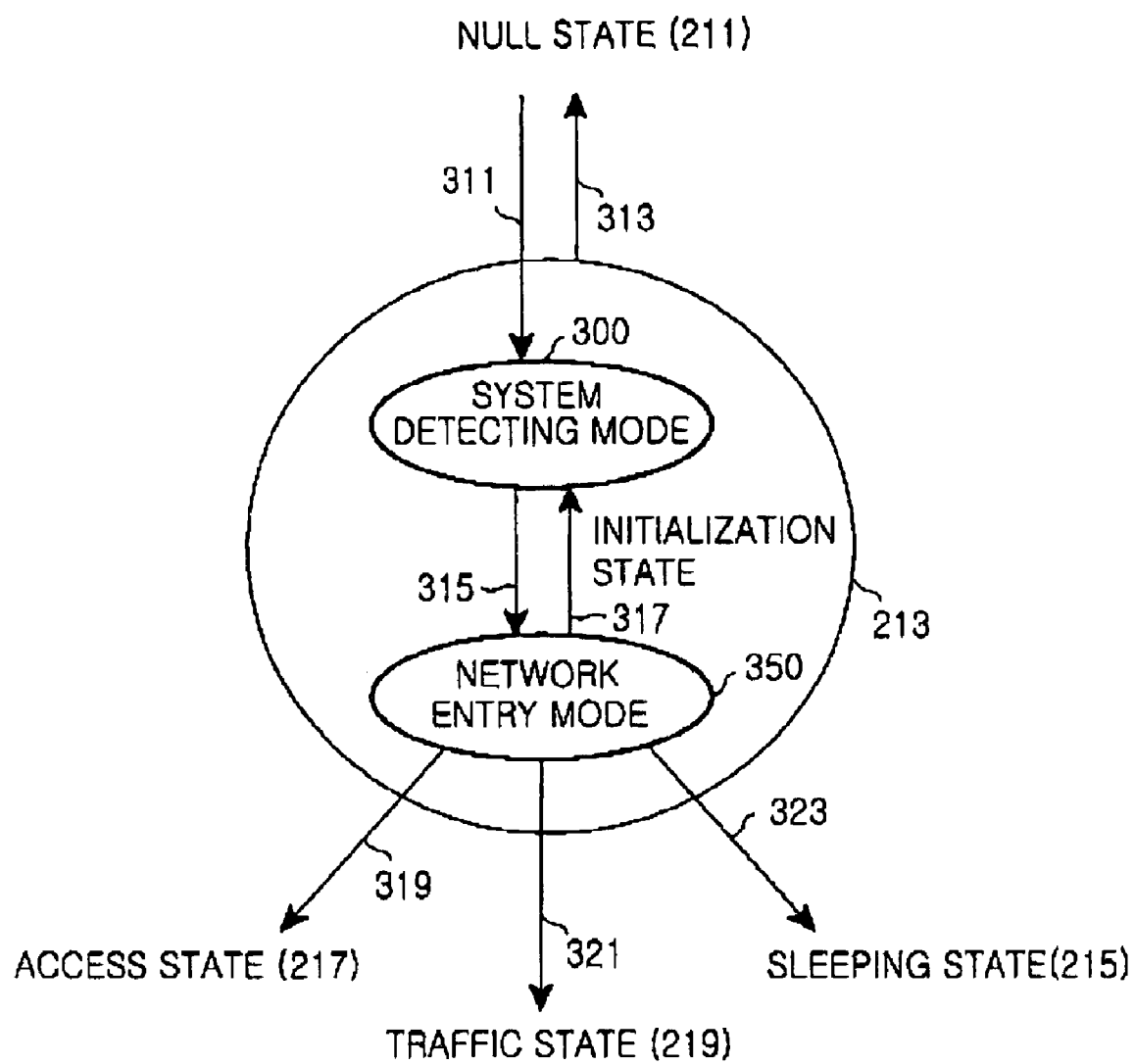
FIG. 3 is a diagram schematically illustrating operation modes of a initialization state a sown in FIG. 2.

FIG. 3 is a diagram schematically illustrating operation modes of the initialization state 213 shown in FIG. 2.

Referring FIG. 3, the initialization state 213 includes two operation modes, that is, a system detecting mode 300 and a network entry mode 350. As described with reference to FIG. 2, when the access terminal normally performs an initial operation following a reset or power-on, the access terminal performs a state transition from the null state 211 into the initialization state 213 (step 311). Also, if the access terminal loses synchronization with the access point due to a problem, such as a system error, in the initialization state 213, the access terminal performs a state transition from the initialization state 213 into the null state 211, thereby again performing an initial operation (step 313). Meanwhile, when the access terminal performs a state transition from the null state 211 into the initialization state 213, the access terminal enters the system detecting mode 300 of the initialization state 213. The system detecting mode 300 will be described hereinafter.

In the system detecting mode 300, the access terminal receives DL-PICH signals transmitted from a plurality of access points, and detects a DL-PICH signal having the greatest intensity, that is, having the highest CINR. In this state, when the access terminal is handed off from a prior access point, to which the access terminal had belonged, to a target access point, the access terminal also performs a synchronization acquisition operation with the target access point. Because the access terminal has to consider a hand-off state, the access terminal has to continuously monitor whether or not there is a second access point which transmits a DL-PICH signal having a higher CINR than that of a DL-PICH signal transmitted from a first access point, to which the access terminal currently belongs. Under such a continuous monitoring operation, when there is a second access point which transmits a DL-PICH signal having a higher CINR than that of a DL-PICH signal transmitted from a first access point to which the access terminal currently belongs, the access terminal performs a cell reselection operation.

When detecting a DL-PICH signal having the highest CINR as described above, the access terminal determines that an access point transmitting the detected DL-PICH signal is to be an access point to which the access terminal belongs, that is, to be a serving access point, and receives a DL-BCCH signal transmitted from the serving access point. The access terminal receives the DL-BCCH signal to detect the system configuration information, the neighbor access point information, the downlink and uplink channel configuration information, the downlink and uplink access information, etc. When the access terminal normally performs the operation required in the system detecting mode 300, that is, the synchronization acquisition operation with the access point, the access terminal performs a mode change from the system detecting mode 300 into the network entry mode 350 so as to perform a network entry operation for transmitting/receiving data to/from the access point (step 315).

In the network entry mode 350, the access terminal performs an initial uplink access operation for network entry using the uplink access information received in the system detecting mode 300. Herein, the initial uplink access operation for the network entry is performed in a contention-based scheme, the access terminal performs the initial uplink access operation through an UL-ACH, and the access point transmits a response to the initial uplink access to the access terminal. The initial uplink access and the response thereto are transmitted/received through an MAC message. In the MAC message in which a response to the initial uplink access is included, also included is the slot index information of a DL-WUCH which the access terminal monitors in the sleeping state 215.

After the access terminal performs a network entry operation in the network entry mode 350, the access terminal performs a state transition into the access state 217 if there is data to be transmitted to the access point (step 319). Also, after the access terminal performs a network entry operation in the network entry mode 350, the access terminal performs a state transition into the traffic state 219 if the access terminal receives paging information which represents that there is data to be transmitted to the access terminal through a DL-BCCH (step 321). Also, when the access terminal has no data to be transmitted/received to/from the access point in the network entry mode 350, the access terminal performs a state transition into the sleeping state 215 (step 323). Finally, in the network entry mode 350, when the access terminal does not perform a normal operation due to a system error and the like, the access terminal performs a mode change into the system detecting mode 300 and again performs an initial operation following a reset.

The above description with reference to FIG. 3 has shown the operation modes of the initialization state 213. Hereinafter, the sleeping state 215 will be described with reference to FIG. 4.

Figure 4:
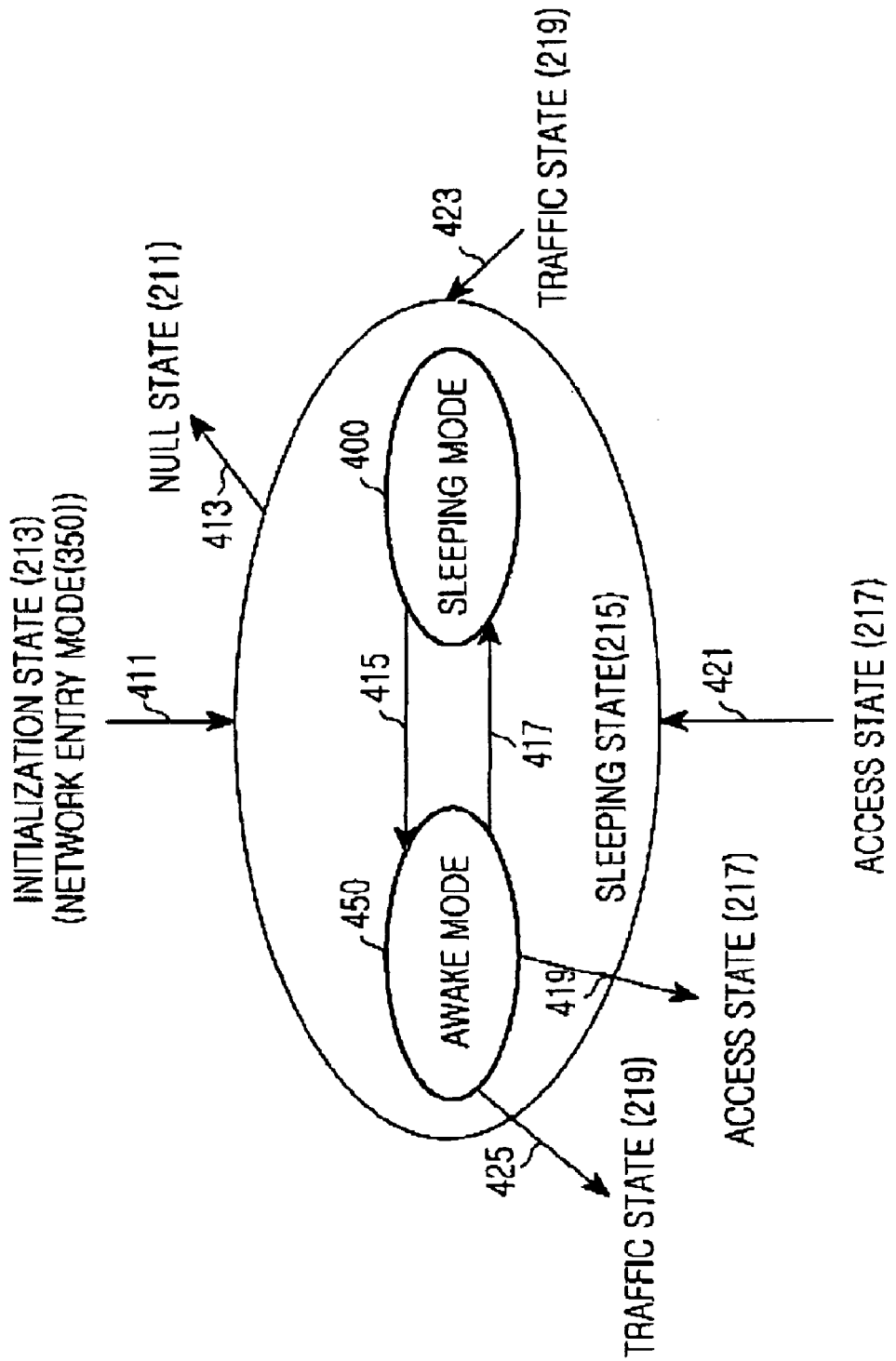
FIG. 4 is a diagram schematically illustrating operation modes of a sleeping state shown in FIG. 2.

FIG. 4 is a diagram schematically illustrating operation modes of the sleeping state 215 shown in FIG. 2. Referring to FIG. 4, the sleeping state 215 includes two operation modes, that is, a sleeping mode 400 and an awake mode 450. As described with reference to FIG. 2, when the access terminal normally performs an network entry operation, the access terminal performs a state transition from the initialization state 213 into the sleeping state 215 (step 411). Also, if the access terminal loses synchronization with the access point due to a problem, such as a system error, in the sleeping state 215, the access terminal performs a state transition from the sleeping state 215 into the null state 211, thereby again performing an initial operation (step 413). Meanwhile, when the access terminal performs a state transition from the initialization state 213 into the sleeping state 215, the access terminal enters the sleeping mode 400 or the awake mode 450 in the sleeping state 215.

First, the sleeping mode 400 will be described hereinafter.

In the sleeping mode 400, the access terminal does not continuously monitor a DL-BCCH transmitted from the access point, but monitors only a DL-WUCH. Therefore, only the case in which the wake-up indicator of the DL-WUCH is turned on, the access terminal performs a mode change from the sleeping mode 400 into the awake mode 450 so as to monitor an DL-BCCH. The case in which the access point sets the wake-up indicator of the DL-WUCH to 'on' occurs when the system information is updated or when the access point contains paging information to notify the access terminal of data to be transmitted to the access terminal. The access terminal monitors only a DL-WUCH while in the sleeping mode 400. The access terminal monitors the DL-BCCH only when the wake-up indicator of the DL-WUCH allocated into the access terminal itself is turned on, thereby minimizing the power consumption. During the monitoring of only the DL-WUCH, when the wake-up indicator of the DL-WUCH is turned on, the access terminal performs a mode change from the sleeping mode 400 into the awake mode 450 (step 415).

Secondly, the awake mode 450 will be described hereinafter. In the awake mode 450, the access terminal monitors a DL-BCCH transmitted from the access point. As described above, since the access point wakes up the access terminal to update the system information or to transmit paging information for notifying the access terminal of data to be transmitted to the access terminal, the access terminal monitors the DL-BCCH and may check whether or not the system information is undated and whether or not the paging information is received from the access point. As a result of the monitoring of the DL-BCCH, when the system information is updated, the access terminal confirms the updated system information and performs a mode change from the awake mode 450 into the sleeping mode 400 (step 417). Also, as a result of the monitoring of the DL-BCCH, when there is paging information that is targeted to access terminal, the access terminal performs a state transition from the awake mode 450 into the traffic state 219 (step 425).

Meanwhile, when the access terminal has data to transmit to the access point, the access terminal performs a state transition from the awake mode 450 into the access state 217, thereby performing an uplink access of a contention-based scheme (step 419). Also, when the access terminal fails in the uplink access in spite of performing the uplink access of a contention-based scheme during a predetermined period of time in the access state 217, the access terminal performs a state transition from the access state 217 into the sleeping state 215 (step 421).

In addition, also when the access terminal cancels the data transmission as well as when the access terminal fails in the uplink access, the access terminal performs a state transition from the access state 217 into the sleeping state 215. Also, in the traffic state 219, when the access terminal has no data to be transmitted to the access point, or when it is needed to reduce the power consumption of the access terminal itself, the access terminal performs a state transition from the traffic state 219 into the sleeping state 215 (step 423).

The above description with reference to FIG. 4 has illustrated the operating modes of the sleeping state 215. Hereinafter, the signal transmitting/receiving process performed between an access point and an access terminal in the initialization state 213 will be described with reference to FIG. 5.

Figure 5:
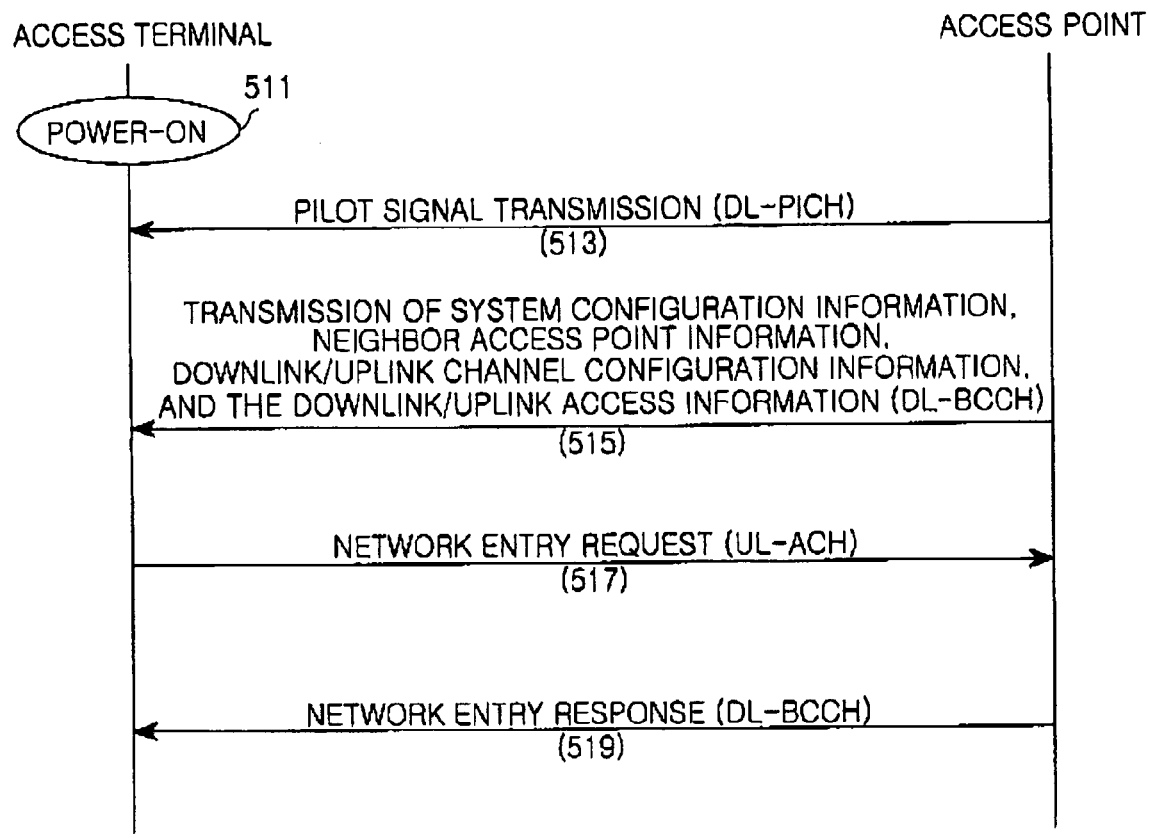
FIG. 5 is a flowchart illustrating a signal transmitting/receiving process performed between an access point and an access terminal in a initialization state shown in FIG. 2.

FIG. 5 is a flowchart illustrating a signal transmitting/receiving process performed between an access point and an access terminal in the initialization state 213 shown in FIG. 2. Referring to FIG. 5, first, when the access terminal is powered on (step 511), the access terminal performs an initial operation in the null state 211. When normally completing the initial operation, the access terminal performs a state transition into the system detecting mode 300 of the initialization state 213. In the system detecting mode 300, the access point transmits a pilot signal through a DL-PICH (step 513), and transmits the system configuration information, the neighbor access point information, the downlink and uplink channel configuration information, the downlink and uplink access information, etc. through a DL-BCCH (step 515). The access terminal acquires synchronization with the access point using a pilot signal received through the DL-PICH in the system detecting mode 300, and then performs a mode change into the network entry mode 350. Then, the access terminal transmits a network entry request message to the access point through a UL-ACH which corresponds to uplink access information received through the DL-BCCH in the network entry mode 350 (step 517). When sensing a network entry request of the access terminal, the access point transmits a network entry response message through a DL-BCCH in response to the network entry request message of the access terminal (step 519). Herein, the network entry response message, as described above, includes slot index information of a DL-WUCH which the access terminal monitors in the sleeping mode.

The above description with reference to FIG. 5 has shown the signal transmitting/receiving process performed between an access point and an access terminal in the initialization state 213. Hereinafter, a signal transmitting/receiving process performed between an access point and an access terminal in the sleeping state 215 will be described with reference to FIG. 6.

Figure 6:
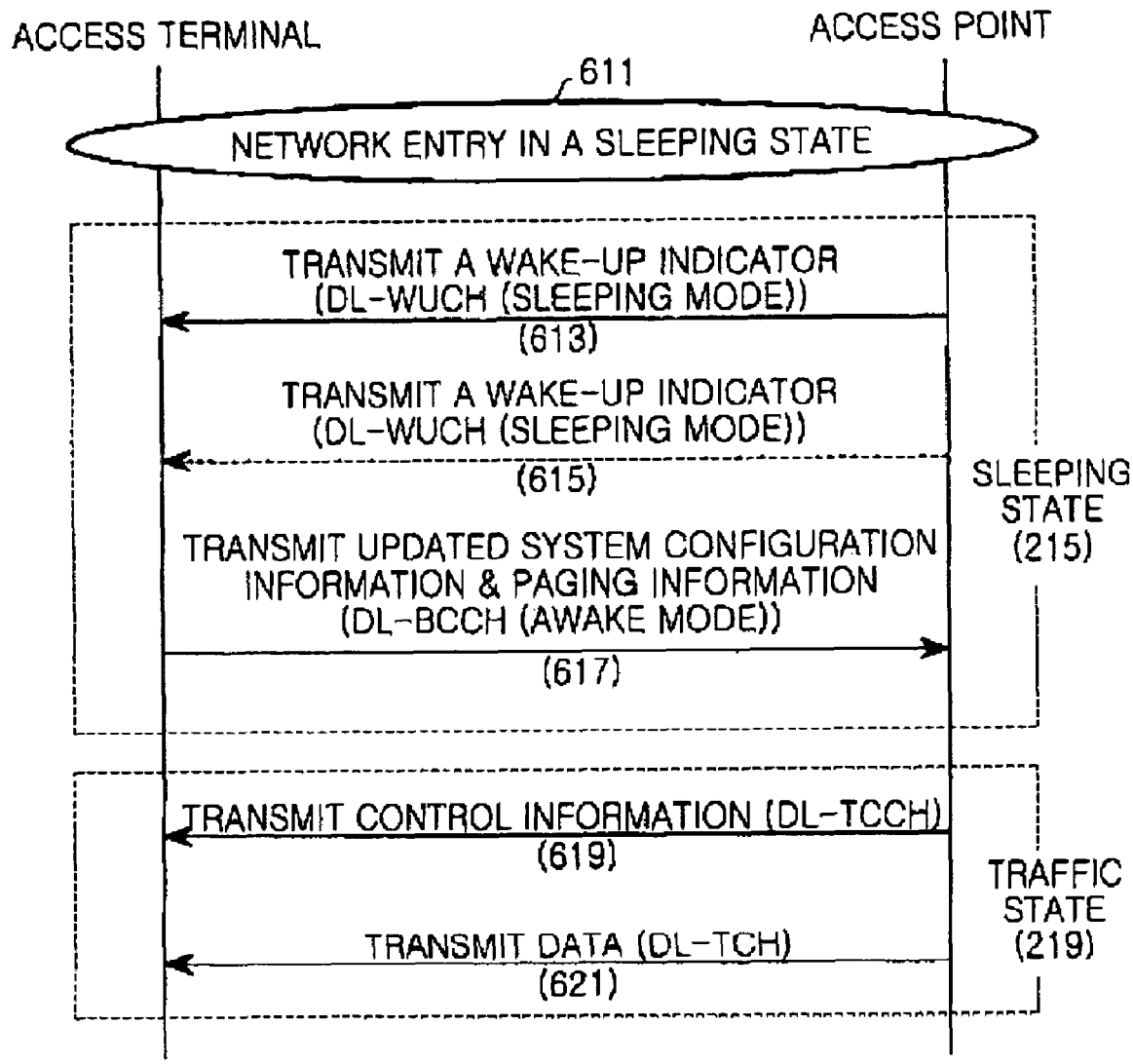
FIG. 6 is a flowchart illustrating a signal transmitting/receiving process performed between an access point and an access terminal in a sleeping state shown in FIG. 2.

FIG. 6 is a flowchart illustrating a signal transmitting/receiving process performed between an access point and an access terminal in the sleeping state 215 shown in FIG. 2.

Referring to FIG. 6, first, when the access terminal accomplishes a network entry in the initialization state 213 (step 611), the access terminal performs a state transition into the sleeping state 215. Herein, the case in which the access terminal performs a state transition from the initialization state 213 into the sleeping state 215 occurs when there is no data to be transmitted/received between the access terminal and the access point. As described above, After accomplishing the network entry in the initialization state 213, if the access terminal has data to be transmitted to the access point, the access terminal performs a state transition into the access state 217, and if the access terminal has data to be received from the access point, the access terminal performs a state transition into the traffic state 219. The access point transmits a wake-up indicator to the access terminal through a DL-WUCH since the access terminal is in the sleeping mode 400 of the sleeping state 215 (step 613).

When the wake-up indicator is in an 'on' state, the access terminal performs a mode change from the sleeping mode 400 into the awake mode 450, but when the wake-up indicator is in an 'off' state, the access terminal is maintained in the sleeping mode 400. In FIG. 6, it is assumed that the wake-up indicator of a DL-WUCH transmitted from the access point in step 613 is in an 'off' state. When the wake-up indicator of a DL-WUCH transmitted from the access point in step 613 is in an 'on' state, the following step 615 may be omitted. When the wake-up indicator of the DL-WUCH is in an 'off' state, the access terminal is maintained in the sleeping mode 400 and receives a DL-WUCH signal transmitted from the access point (step 615).

Meanwhile, in step 615, when the wake-up indicator of a DL-WUCH transmitted from the access point is in an 'on' state, the access terminal performs a mode change from the sleeping mode 400 into the awake mode 450. When the access terminal is in the awake mode 450, the access point transmits the updated system information or paging information through the DL-BCCH (step 617). As described above, when the access point has updated system information to be transmitted through the DL-BCCH, or when the access point desires to transmit paging information to the access terminal, the access terminal first transmits the wake-up indicator of the DL-WUCH which is in an 'on' state, and then transmits the updated system information or paging information through the DL-BCCH.

When there is data to be transmitted from the access point to the access terminal, that is, when the access point transmits paging information to the access terminal through the DL-BCCH, the access terminal performs a state transition from the sleeping state 215 into the traffic state 219. Therefore, the access terminal is in the traffic state 219, and then the access point transmits the control information, which is required for a DL-TCH to be used to transmit data, to the access terminal through a DL-TCCH (step 619). The access terminal, which receives the control information relating to a DL-TCH through a DL-TCCH, completes preparation for receiving the actual data, and the access point transmits the actual data to the access terminal through the DL-TCH (step 621). It should be noted that steps 619 and 621 are described because the steps are performed in connection with the sleeping state 215, although the steps are not performed actually in the sleeping state 215.

The above description with reference to FIG. 6 has shown the signal transmitting/receiving process performed between an access point and an access terminal in the sleeping state 215. Hereinafter, an operation process of the access point in the sleeping state 215 will be described with reference to FIG. 7.

Figure 7:
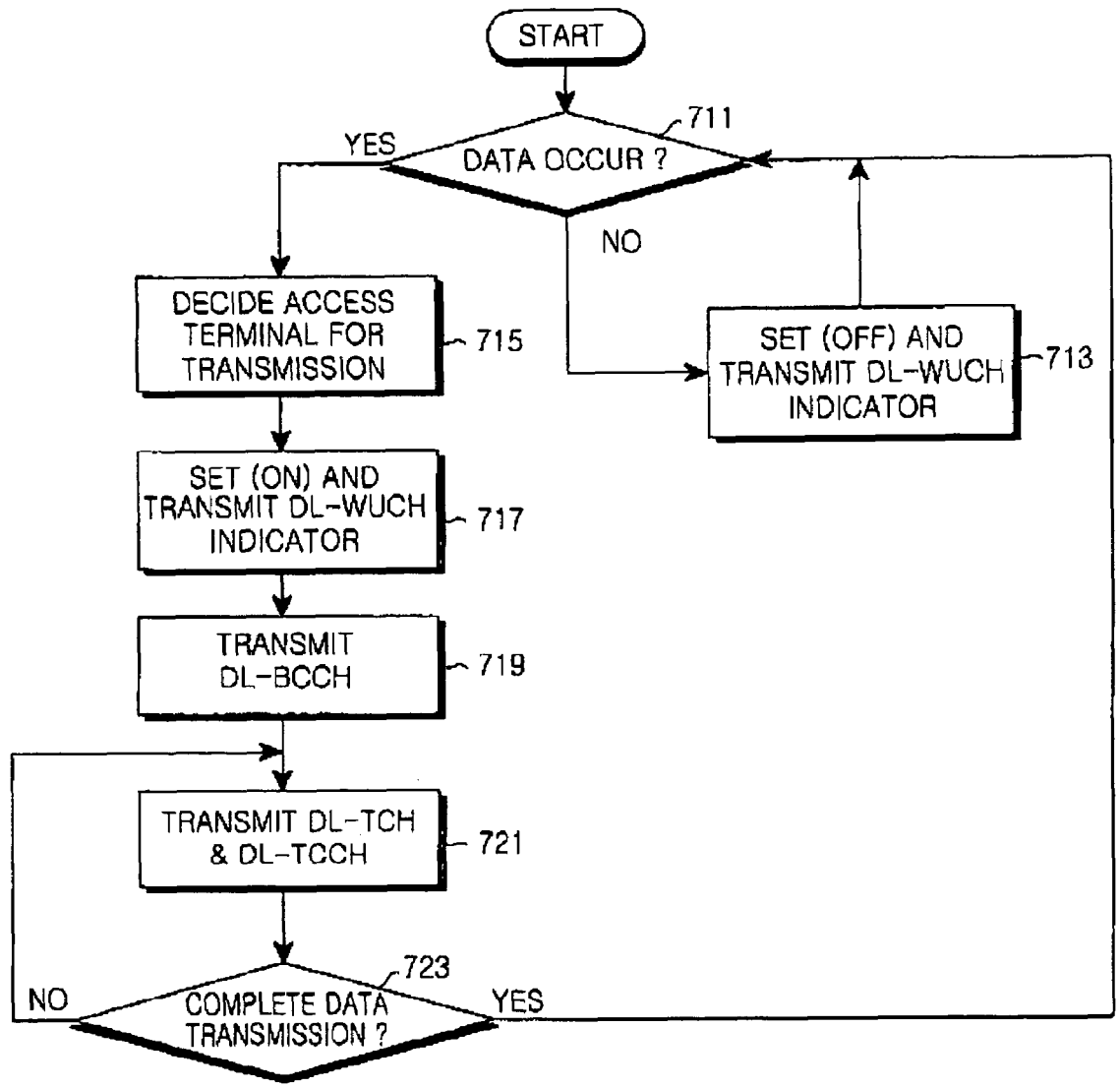
FIG. 7 is a flowchart illustrating an operation process of the access point in a sleeping state shown in FIG. 2.

FIG. 7 is a flowchart illustrating an operation of the access point in the sleeping state 215 shown in FIG. 2.

Referring to FIG. 7, first, the access point determines whether or not data to be transmitted to the access terminal is generated in step 711. As a result, when data to be transmitted to the access terminal is not generated, the access point proceeds to step 713. In step 713, since no data is to be transmitted to the access terminal, the access point sets the wake-up indicator of a DL-WUCH to 'off', transmits the wake-up indicator of the DL-WUCH, and returns to step 711. As a result, when there is data to be transmitted to the access terminal, the access point proceeds to step 715. In step 715, the access point determines an access terminal which the access point targets for the data to be transmitted, and then proceeds to step 717.

In step 717, since there is data to be transmitted to the access terminal, the access point sets the wake-up indicator of a DL-WUCH to 'on', transmits the wake-up indicator of the DL-WUCH, and then proceeds to step 719. In this time, the access terminal monitors only the DL-WUCH because it is in the sleeping mode 400 of the sleeping state 215, and the access terminal performs a mode change from the sleeping mode 400 into the awake mode 450 only when it receives the wake-up indicator of the DL-WUCH that is set to 'on'. In step 719, the access point transmits the paging information, which represents that there is data to be transmitted to the access terminal, to the access terminal through a DL-BCCH, and then proceeds to step 721. Then, the access terminal receives the paging information through the DL-BCCH, and performs a state transition from the awake mode 450 into the traffic state 219.

In step 721, the access point transmits the control information for transmitting a DL-TCH, which is used to transmit data, to the access terminal through a DL-TCCH, transmits data to the access terminal through the DL-TCH, and then proceeds to step 723. Herein, the control information to be transmitted through the DL-TCCH includes the AMC scheme information, the information used in a data decoding, such as EP, the MAC control information, etc.

In step 723, the access terminal determines whether or not the data transmission is complete. Whether or not the data transmission is completed may be determined according to whether or not there is any remaining data in a transmission buffer to be sent to the access point. That is, when there is data stored in the transmission buffer, the access point determines that the data is being transmitted, but when there is no data stored in the transmission buffer, the access point determines that the data transmission is complete. As a result of step 723, when the data transmission is not complete, the access point returns to step 721. As a result of step 723, when the data transmission is complete, the access point returns to step 711.

In the description with reference to FIG. 7, an operation of the access point is explained with respect to the case in which the access point transmits data to the access terminal which is in the sleeping state 215. Although a separate description is not given in FIG. 7, that the access point transmits the updated system information can also be achieved in a similar operation to that described in FIG. 7. That is, when the access point determines that there is updated system information, the access point sets the wake-up indicator of a DL-WUCH to 'on', transmits the wake-up indicator of the DL-WUCH, and then transmits the updated system information through the DL-BCCH. The access terminal receives the wake-up indicator of the DL-WUCH which is set to 'on', and performs a mode change from the sleeping mode 400 into the awake mode 450, thereby receiving the updated system information through the DL-BCCH. After this, the access terminal performs a mode change from the awake mode 450 into the sleeping mode 400.

The above description with reference to FIG. 7 has shown the operation process of the access point in the sleeping state 215. Hereinafter, an operation process of the access terminal in the sleeping state 215 will be described with reference to FIG. 8.

Figure 8:
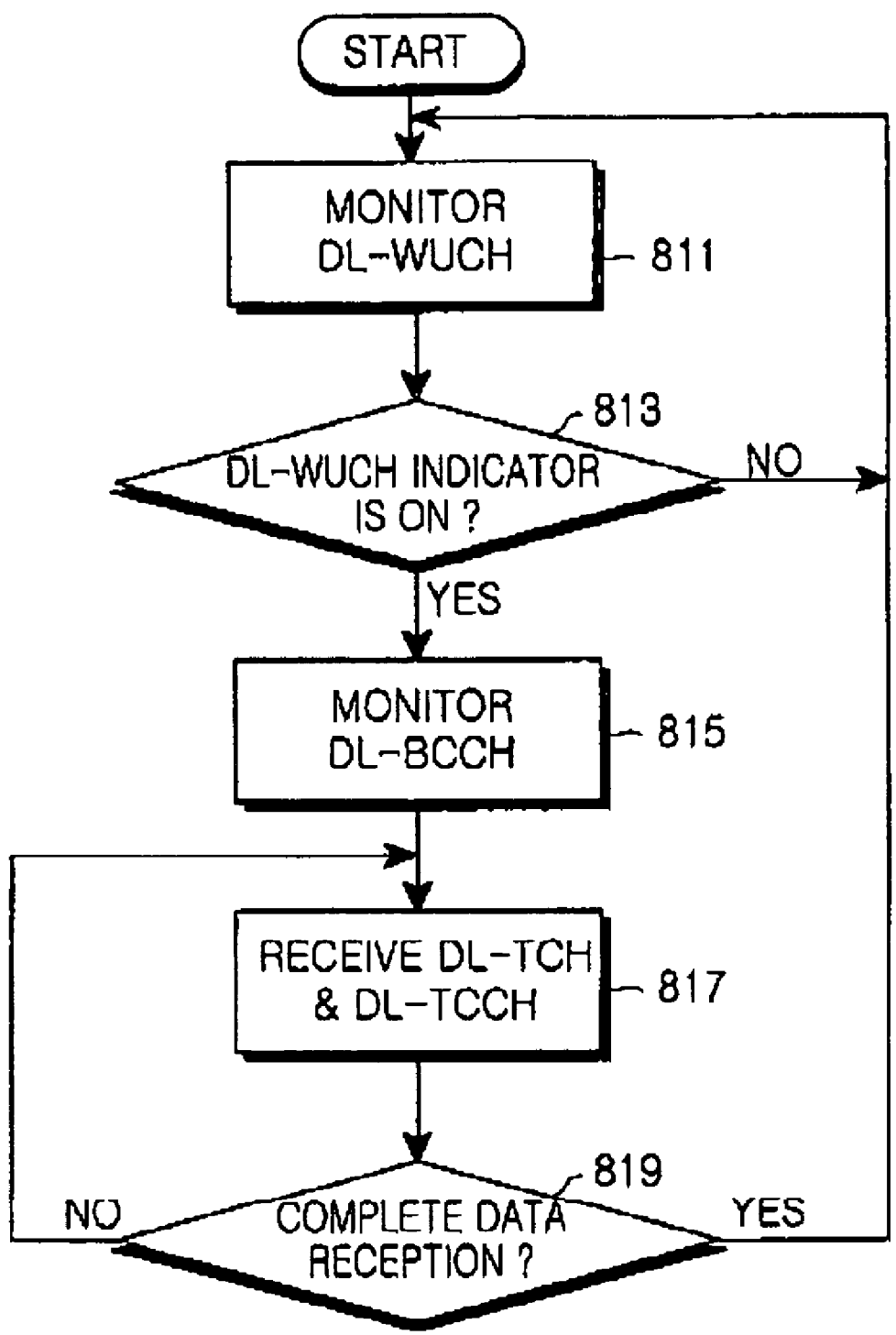
FIG. 8 is a flowchart illustrating an operation process of the access terminal in a sleeping state shown in FIG. 2.

FIG. 8 is a flowchart illustrating an operation process of the access terminal in the sleeping state 215 shown in FIG. 2. Referring to FIG. 8, first, the access terminal monitors only a DL-WUCH in the sleeping mode 400 of the sleeping state 215 in step 811, and then proceeds to step 813. In step 813, the access terminal determines whether or not the wake-up indicator of the DL-WUCH is set to 'on'. As a result, when the wake-up indicator of the DL-WUCH is not set to 'on', that is, when the wake-up indicator of the DL-WUCH is set to 'off', the access terminal returns to step 811. As a result of step 813, when the wake-up indicator of the DL-WUCH is set to 'on', the access terminal proceeds to step 815. In step 815, the access terminal performs a mode change from the sleeping mode 400 into the awake mode 450, monitors a DL-BCCH in the awake mode 450, and proceeds to step 817. Through the DL-BCCH, updated system information and paging information is transmitted. Herein, a description will be given with reference to FIG. 8 for the case in which paging information is transmitted through the DL-BCCH as an example, corresponding to the operation of the access point shown in FIG. 7. When the access terminal receives the paging information through the DL-BCCH, the access terminal performs a state transition from the awake mode 450 into the traffic state 219.

In step 817, the access terminal receives a DL-TCH signal and a DL-TCCH signal transmitted from the access point, and then proceeds to step 819. In step 819, the access terminal determines whether or not the data reception is complete. As a result, when the data reception is complete, the access terminal returns to step 811. In contrast, as a result, when the data reception is not complete, the access terminal returns to step 817.

In the description with reference to FIG. 8, an operation of the access terminal is explained with respect to the case in which the access point transmits data to the access terminal which is in the sleeping state 215. Although a separate description is not given in FIG. 8, the transmission of the updated system information by the access point can also be achieved in a similar operation to that shown in FIG. 8. That is, when the access point senses that there is updated system information, the access point sets the wake-up indicator of a DL-WUCH to 'on', transmits the wake-up indicator of the DL-WUCH, and then transmits the updated system information through the DL-BCCH. In this time, the access terminal receives the wake-up indicator of the DL-WUCH which is set to 'on', and performs a mode change from the sleeping mode 400 into the awake mode 450, thereby receiving the updated system information through the DL-BCCH. After this, the access terminal performs a mode change from the awake mode 450 into the sleeping mode 400.

The above description with reference to FIG. 8 has shown the operation process of the access terminal in the sleeping state 215. Hereinafter, a construction of a DL-WUCH transmitter will be described with reference to FIG. 9.

Figure 9:
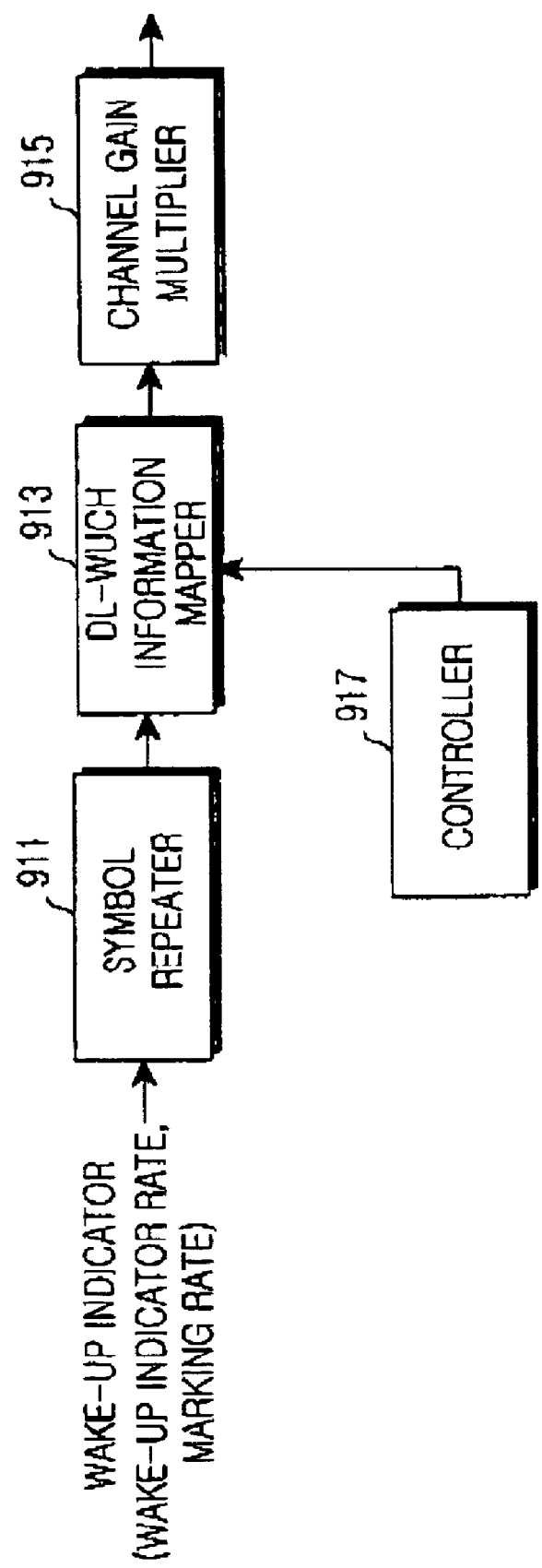
FIG. 9 is a block diagram illustrating a construction of a DL-WUCH transmitter according to an embodiment of the present invention.

FIG. 9 is a block diagram illustrating a construction of a DL-WUCH transmitter according to an embodiment of the present invention. Referring to FIG. 9, first, when a wake-up indicator to be transmitted through a DL-WUCH is input into the transmitter, the wake-up indicator is transferred to a symbol repeater 911. Not only the wake-up indicator but also a wake-up indicator rate and a marked rate are simultaneously input to the symbol repeater 911. The wake-up indicator rate represents the number of frames included in a super frame, and the marked rate represents a transmission period of a wake-up indicator to be transmitted to an access terminal. For example, in a case in which four frames make one super frame and the wake-up indicator is transmitted in one frame unit, the wake-up indicator rate is 'four' and the marked rate is 'one'. The symbol repeater 911 repeats a symbol of the input wake-up indicator, and then outputs the wake-up indicator to a DL-WUCH information mapper 913. According to the symbol repetition operation of the symbol repeater 911, the transmission rate of the DL-WUCH is determined.

Meanwhile, when data has been generated, a controller 917 determines an access terminal targeted by the generated data, and transmits DL-WUCH slot index information of the access terminal to which the data is to be transmitted and the information representing that the wake-up indicator has to be set to 'on', to the DL-WUCH information mapper 913. The DL-WUCH information mapper 913 sets the wake-up indicator to 'on' in a slot, which corresponds to a DL-WUCH slot index information of the access terminal to which the data is to be transmitted, and then outputs the wake-up indicator to a channel gain multiplier 915. When there is no data, the controller 917 transmits DL-WUCH slot index information of a relevant access terminal and information representing that the wake-up indicator has to be set to 'off', to the DL-WUCH information mapper 913. The DL-WUCH information mapper 913 sets the wake-up indicator to 'off' in a slot, which corresponds to a DL-WUCH slot index information of the relevant access terminal, and then outputs the wake-up indicator to the channel gain multiplier 915. The channel gain multiplier 915 multiplies a signal output from the DL-WUCH information mapper 913 by a predetermined channel gain value, and then outputs the resultant. Accordingly, a signal output from the channel gain multiplier 915 is transmitted to an access terminal.

The above description with reference to FIG. 9 has shown the construction of a DL-WUCH transmitter according to an embodiment of the present invention. Hereinafter, an operation of an access terminal in the access state 217, which is shown in FIG. 2, will be described with reference to FIG. 10.

Figure 10:
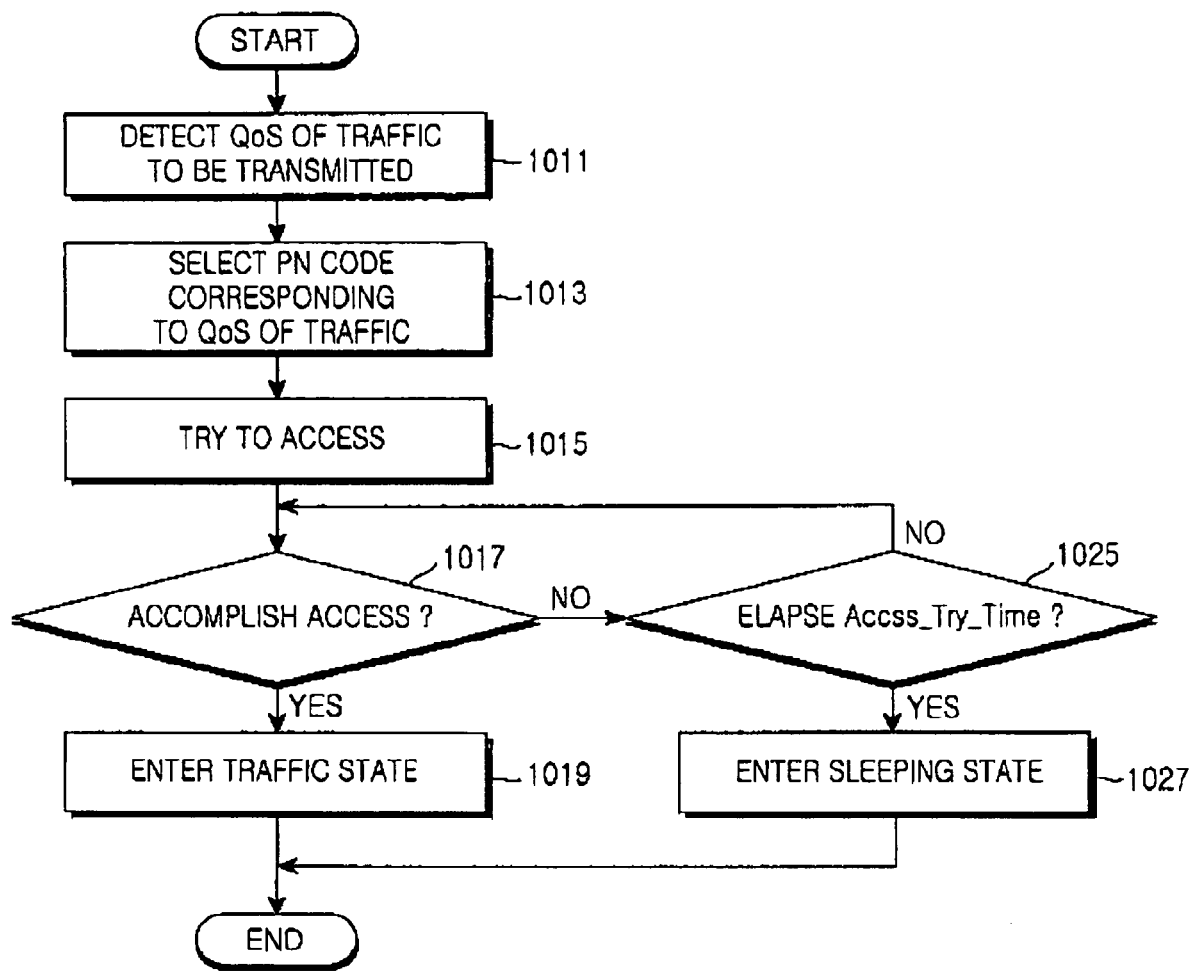
FIG. 10 is a flowchart illustrating an operation process of an access terminal in an access state shown in FIG. 2.

FIG. 10 is a flowchart illustrating an operation process of an access terminal in the access state 217 shown in FIG. 2. Prior to the description of FIG. 10, it should be noted that the access state 217 proposed in the present invention is a state for transmitting a bandwidth allocation request message from an access terminal to an access point when the access terminal desires to transmit traffic, and a state for receiving a bandwidth allocation response message which is a response message to the bandwidth allocation request message, thereby performing uplink access. Also, as described above, it should be noted that the access point has already allocated the PN codes, which are used when an access terminal transmits a bandwidth allocation request message, according to the QoS of the traffic, and the access terminal uses the PN codes differentially applied according to the QoS of the transmitted traffic when transmitting a bandwidth allocation request message.

Referring to FIG. 10, first, when traffic to be transmitted from the access terminal is generated, the access terminal detects the QoS of the traffic to be transmitted in step 1011, and then proceeds to step 1013. Herein, to detect the QoS of the traffic, as described above, means to detect a QoS class of the traffic. That is, to detect whether the traffic is UGS traffic, or real time service traffic, or non-real time service traffic, or best effort traffic. In step 1013, the access terminal selects a PN code, which is applied to a bandwidth allocation request message, according to the detected QoS and then proceeds to step 1015.

Herein, to select a PN code corresponding to the detected QoS, as described above, means to select a certain PN code from among the PN codes allocated to be applied to UGS traffic in a case in which the QoS is UGS, to select a certain PN code from among PN codes allocated to be applied to real time service traffic in a case in which the QoS is real time service, to select a certain PN code from among PN codes allocated to be applied to non-real time service traffic in a case in which the QoS is non-real time service, and to select a certain PN code from among PN codes allocated to be applied to best effort traffic in a case in which the QoS is best effort. Accordingly, the PN code is used as a scrambling code. Meanwhile, the access terminal can receive information about the PN codes allocated according to the QoS of the traffic, through the DL-BCCH, in the initialization state 213 or the sleeping state 215, that is, in a state before a state transition is performed into the access state 217.

In step 1015, the access terminal tries the uplink access, that is, the access terminal scrambles the bandwidth allocation request message using the selected PN code and transmits the scrambled bandwidth allocation request message to the access point through the UL-ACH, and then proceeds to step 1017. In step 1017, the access terminal determines whether or not the uplink access is accomplished, that is, whether or not the access terminal receives a bandwidth allocation response message in response to the bandwidth allocation request message by monitoring a DL-USCCH transmitted from the access point. Here, the access terminal may update the PN code information using the bandwidth allocation response message transmitted through the DL-USCCH. That is, the access terminal acquires PN code information transmitted from the access point through a DL-BCCH when performing the uplink access, since the access point notifies the access terminal of a PN code through the DL-USCCH so that the access terminal may perform the fast access when the access terminal is not allocated an uplink bandwidth as a result of the uplink access performance.

As a result of step 1017, the access terminal does not receive a bandwidth allocation response message through the DL-USCCH, the access terminal proceeds to step 1025. In step 1025, the access terminal determines whether or not an Access_Try_Time, which is a waiting time for receiving the bandwidth allocation response message, lapses. As a result, when the Access_Try_Time does not lapse, the access terminal returns to step 1017 and continuously monitors whether or not the access terminal receives a bandwidth allocation response message through the DL-USCCH. In contrast, as a result of step 1025, when the Access_Try_Time lapses, the access terminal proceeds to step 1027. In step 1027, since the access terminal fails in the uplink access, the access terminal performs a state transition from the access state 217 into the sleeping state 215 and ends the uplink access process.

As a result of step 1017, the access terminal receives a bandwidth allocation response message through the DL-USCCH, the access terminal proceeds to step 1019. In step 1019, since the access terminal receives the bandwidth allocation response message, the access terminal performs a state transition from the access state 217 into the traffic state 219 and ends the uplink access process. A state transition procedure from the access state 217 into the traffic state 219 will be described in detail hereinafter.

The bandwidth allocation response message includes either the uplink bandwidth information which the access point allocates into the access terminal for uplink traffic transmission of the access terminal, or the PN code information, that is, the fast access PN code information, which the access point allocates to the access terminal to first allocate an uplink bandwidth into the access terminal when the access point has no currently available uplink bandwidth, that is, so as to permit a fast access of the access terminal. In the access state 217, although the access terminal is allocated only the fast access PN code through the bandwidth allocation response message, the access terminal determines that the uplink access has already been accomplished, thereby performing a state transition from the access state 217 into the traffic state 219. When performing a state transition from the access state 217 into the traffic state 219, the transition is performed into the different modes of the traffic state 219 depending on whether the access terminal is allocated the uplink bandwidth or the access terminal is allocated the fast access PN code, which will be described in detail later.

Also, as described with reference to FIG. 2, although not shown in FIG. 3, when the access terminal cancels the traffic transmission as well as when the access terminal fails in the uplink access in the access state 217, the access terminal also performs a state transition from the access state 217 into the sleeping state 215. Meanwhile, while the access terminal is performing the uplink access in the access state 217, if the access terminal loses its synchronization with the access point due to a problem, such as a system error, the access terminal performs a state transition from the access state 217 into the null state 211, thereby performing an initial operation again. That is, when the access terminal is reset due to a problem, such as a system error, it is necessary that the access terminal newly starts its operation in the null state 211.

The above description with reference to FIG. 10 has shown the operation process of an access terminal in the access state 217. Hereinafter, a signal transmitting/receiving process performed between an access point and an access terminal in the access state 217, which is shown in FIG. 2, will be described with reference to FIG. 11.

Figure 11:
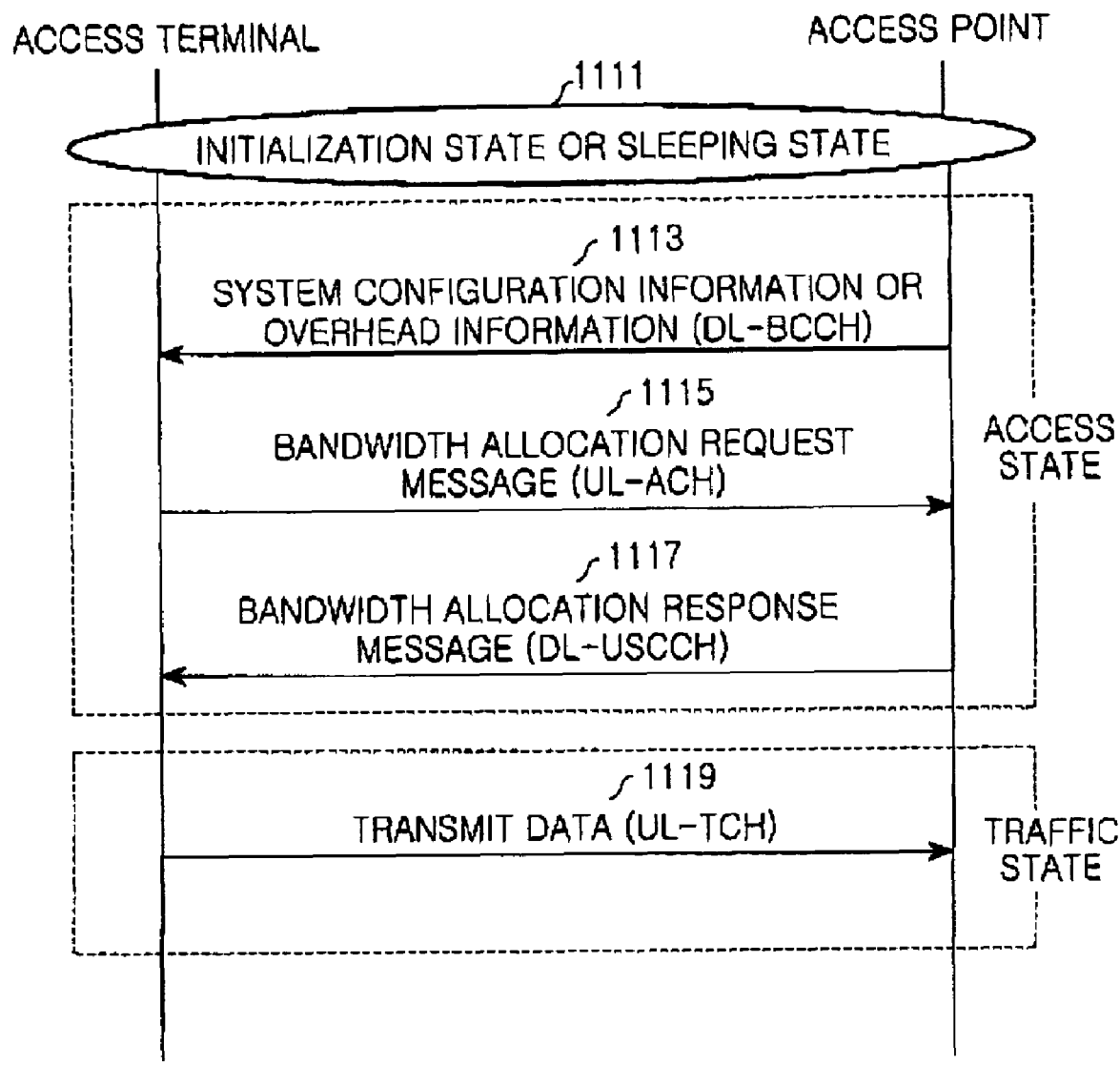
FIG. 11 is a flowchart illustrating a signal transmitting/receiving process performed between an access point and an access terminal in an access state shown in FIG. 2.

FIG. 11 is a flowchart illustrating a signal transmitting/receiving process performed between an access point and an access terminal in the access state 217 shown in FIG. 2. Referring to FIG. 11, first, while the access terminal is in the initialization state 213 or in the sleeping state 215 (step 1111), the access terminal receives the system configuration information, overhead information, etc., which are transmitted from the access point through a DL-BCCH (step 1113). Then, either in the sleeping state 215 or after the access terminal accomplishes the network entry in the initialization state 213, when the access terminal has traffic to be transmitted to the access point, the access terminal performs a state transition from the initialization state 213 or from the sleeping state 215 into the access state 217.

In the access state 217, since the access terminal has traffic to be transmitted through an uplink, the access terminal detects the QoS of the traffic to be transmitted, and selects a PN code allocated according to the detected QoS. The access terminal scrambles a bandwidth allocation request message using the selected PN code and transmits the scrambled bandwidth allocation request message to the access point through a UL-ACH (step 1115). After transmitting the bandwidth allocation request message, the access terminal monitors a DL-USCCH and receives a bandwidth allocation response message which is a response message to the bandwidth allocation request message (step 1117). When receiving the bandwidth allocation response message, the access terminal performs a state transition from the access state 217 into the traffic state 219. Then, in the traffic state 219, the access terminal transmits traffic to the access point through a UL-TCH which corresponds to the uplink bandwidth allocation information included in the bandwidth allocation response message (step 1119). Of course, as described above, when the bandwidth allocation response message includes only fast access PN code information, the access terminal does not directly transmit the traffic in the traffic state 219, but can transmit the traffic when an available uplink bandwidth exists in the access point.

The above description with reference to FIG. 11 has shown the signal transmitting/receiving process performed between an access point and an access terminal in the access state 217 shown in FIG. 2. Hereinafter, an operation process of an access point in the access state 217, which is shown in FIG. 2, will be described with reference to FIG. 12.

Figure 12:
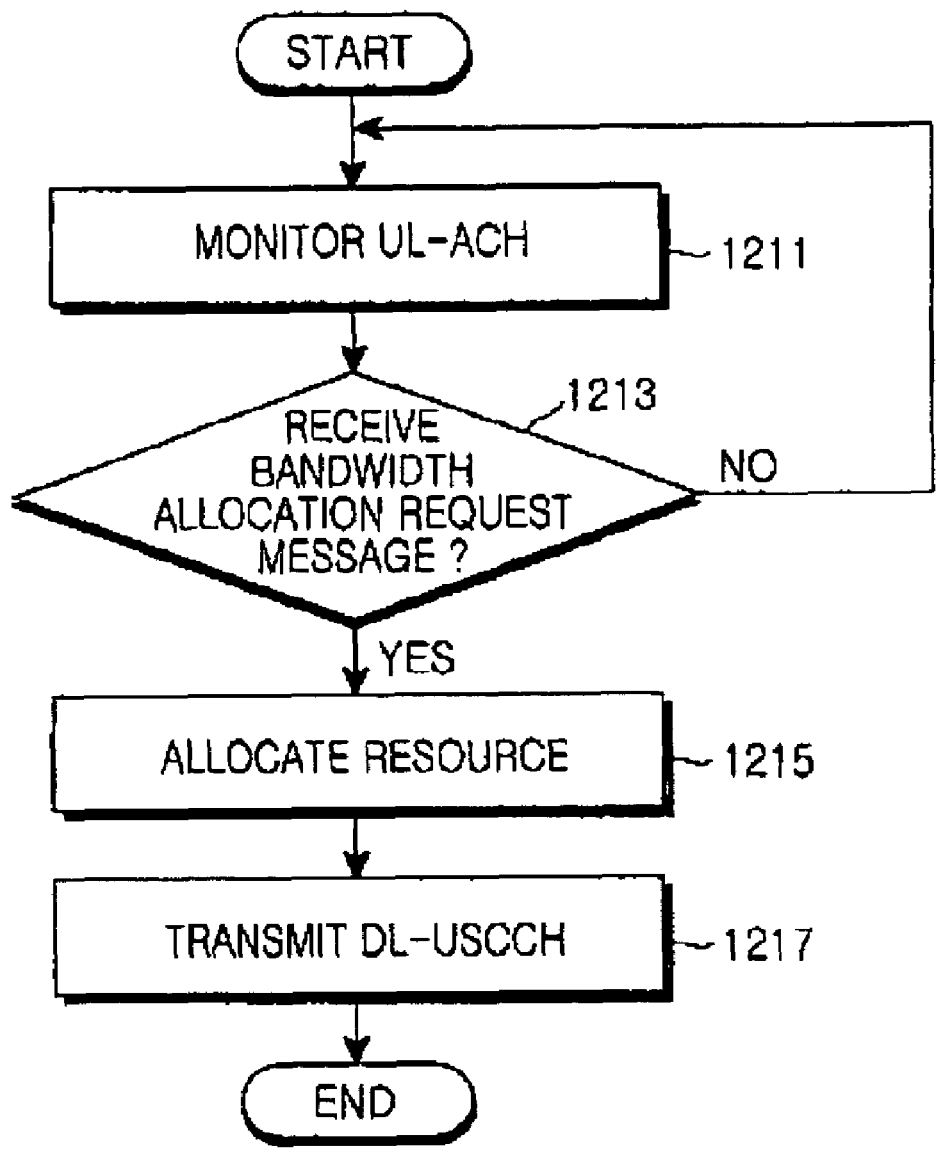
FIG. 12 is a flowchart illustrating an operation process of an access point in a access state shown in FIG. 2.

FIG. 12 is a flowchart illustrating an operation process of an access point in the access state 217 shown in FIG. 2. Referring to FIG. 12, first, the access point monitors a UL-ACH in step 1211, and then proceeds to step 1213. In step 1213, the access point determines whether or not the access point receives a bandwidth allocation request message from the access terminal, as a result of the monitoring of the UL-ACH. As a result, when the access point does not receive a bandwidth allocation request message from the access terminal, the access point proceeds to step 1211 to continuously monitor the UL-ACH.

In contrast, as a result of step 1213, the access point receives a bandwidth allocation request message from the access terminal, the access point proceeds to step 1215. In step 1215, the access point determines the QoS of the traffic, which the access terminal desires to transmit through an uplink, according to a PN code by which the bandwidth allocation request message is scrambled, and then allocates a resource for the traffic to the access terminal. After this, the access point proceeds to step 1217. Here, 'resource' means either an uplink bandwidth or a fast access PN code. When the access point can allocate an uplink bandwidth to an access terminal, the uplink bandwidth becomes the 'resource'. In contrast, in the case where the access point cannot allocate an uplink bandwidth to an access terminal because there is no available uplink bandwidth, when the QoS of traffic to be transmitted from the access terminal through an uplink is high, the access terminal allocates a fast access PN code to the access terminal so that the access terminal may perform the fast access later and receive an uplink bandwidth. In this case, the fast access PN code becomes the 'resource'. In step 1217, the access point causes the information about the allocated resource to be included in a bandwidth allocation response message, and transmits the bandwidth allocation response message to the access terminal through a DL-USCCH.

In FIG. 12, for the convenience of description, while a description is given for a case in which the access point allocates a resource to the uplink access of one access terminal, it will be understood that the access point may allocate the resource of the uplink access to a plurality of access terminals to which the access point provides service.

The above description with reference to FIG. 12 has shown the operation process of an access point in the access state 217 shown in FIG. 2. Hereinafter, operation modes of the traffic state 219 will be described with reference to FIG. 13.

Figure 13:
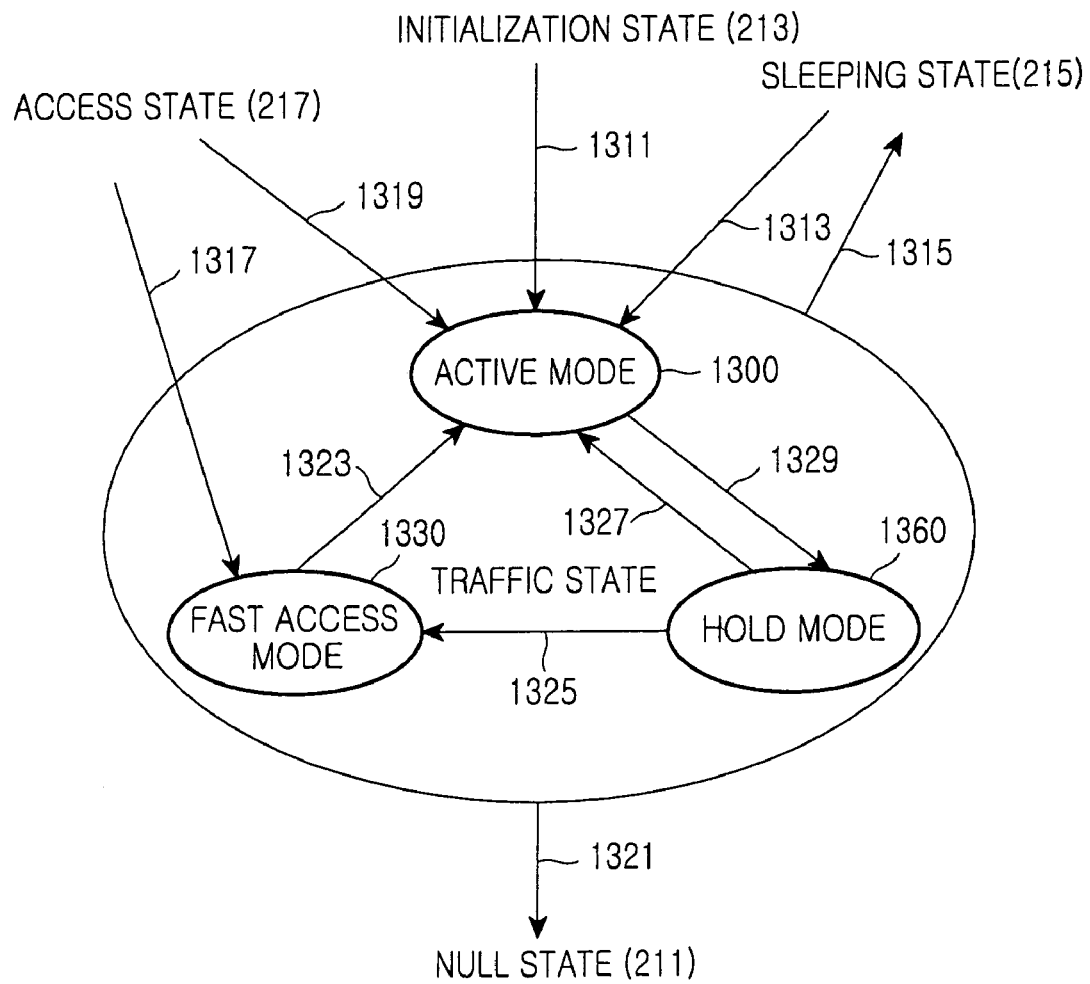
FIG. 13 is a view showing operation modes of a traffic state shown in FIG. 2.

FIG. 13 is a view showing operation modes of the traffic state 219 shown in FIG. 2. Referring to FIG. 13, first, the traffic state 219 includes three operation modes, that is, an active mode 1300, a fast access mode 1330, and a hold mode 1360. As described with reference to FIG. 2, after the access terminal normally performs a network entry operation, the access terminal monitors a DL-USCCH transmitted from the access point. During the monitoring of the DL-USCCH, when the access terminal senses that there is data to be transmitted from the access point to the access terminal, the access terminal performs a state transition from the initialization state 213 into the traffic state 219 (step 1311). Also, if the access terminal loses its synchronization with the access point due to a problem, such as a system error, in the traffic state 219, the access terminal performs a state transition from the traffic state 219 into the null state 211, thereby performing an initial operation (step 1321). Meanwhile, when the access terminal performs a state transition from the initialization state 213 into the traffic state 219, the access terminal enters the active mode 1300 of the traffic state 219.

Also, during monitoring of the channels, such as the DL-BCCH, DL-WUCH, DL-USCCH, etc., in the sleeping state 215, when the access terminal senses that there is data to be transmitted from the access point to the access terminal itself, the access terminal enters the active mode 1300 of the traffic state 219 (step 1313). Unlike this, when data transmission/reception between the access point and the access terminal has been completed in the traffic state 219, the access terminal performs a state transition into the sleeping state 215 (step 1315). Here, the access terminal, which has performed the state transition into the sleeping state 215, monitors the wake-up indicator of a DL-WUCH allocated from the access point, as described with reference to FIG. 2, thereby minimizing power consumption.

Also, when the access terminal accomplishes the uplink access in the access state 217, the access terminal enters either the active mode 1300 or the fast access mode 1330 of the traffic state 219 (step 1317). Now, a detailed description will be given for cases in which the access terminal enters the active mode 1300 or the fast access mode 1330 of the traffic state 219 from the access state 217.

First, a case in which the access terminal enters the active mode 1300 of the traffic state 219 from the access state 217 occurs when the access terminal is allocated an uplink bandwidth from the access point according to the uplink access in the access state 217. Secondly, a case in which the access terminal enters the fast access mode 1330 of the traffic state 219 from the access state 217 occurs when the access terminal is not allocated an uplink bandwidth but is allocated either a fast access PN code or a fast access time slot as a result of uplink access performance in the access state 217.

The active mode 1300 will now be described. First, the active mode 1300 is a mode in which data of all QoS classes can be transmitted. During transmitting/receiving of the data between the access terminal and the access point in the active mode 1300, when the transmission/reception of the data is temporarily interrupted, the access terminal enters the hold mode 1360 (step 1329). However, with respect to the UGS data and the real time service data, the hold mode 1360 is not supported. That is, the UGS data and the real time service data has a rigid limitation to a delay time due to inherent characteristics of the data when the data is transmitted/received. Therefore, although the transmission/reception of data is temporarily interrupted while the access terminal is transmitting/receiving the UGS data or the real time service data to/from the access point in the active mode 1300, the access terminal does not enter the hold mode 1360 but is maintained in the active mode 1300, thereby rapidly supporting the transmission/reception of data to be re-generated later. A mode change from the active mode 1300 into the hold mode 1360 is achieved when the access point or the access terminal transmits a mode change request message, which will be described in detail later.

Next, a description will be given for the fast access mode 1330. The fast access mode 1330, as described above, is a mode in which the access terminal performs the fast access to the access point, when the access terminal is not allocated an actual uplink bandwidth in its uplink access attempt but is allocated a fast access PN code or a fast access time slot. When the access terminal performs the uplink access using the allocated fast access PN code, the probability of contention is minimized in performing the uplink access of a contention-based scheme, so that the access terminal can perform fast access. Also, the access terminal performs the uplink access using the allocated fast access time slot, the access terminal performs the fast access in a contention-free scheme. As a result, when the access point accomplishes the uplink access in the fast access mode 1330, the access terminal enters the active mode 1300 so as to transmit data to the access point (step 1323).

Next, a description will be given for the hold mode 1360. The hold mode 1360, as described above, is a mode in which the transmission/reception between the access terminal and the access point is temporarily interrupted. When data to be transmitted to the access point is generated in the hold mode 1360, the access terminal performs the uplink access to the access point. Also, since the hold mode 1360 is not a state in which the connection itself for transmission/reception of data is ended, a case in which the access terminal has to transmit a response message to the data transmitted from the access point, or a different message corresponding to the response message, may occur. In this case, since the access terminal has to perform faster uplink access than normal uplink access performed in the access state 217, the access terminal performs a mode change from the hold mode 1360 into the fast access mode 1330 (step 1325).

Meanwhile, in the hold mode 1360, the access terminal does not continuously monitor a DL-BCCH, but monitors a DL-WUCH, thereby minimizing the power consumption. During the monitoring of the DL-WUCH in the hold mode 1360 as described above, when a wake-up indicator is turned on, the access terminal enters the active mode 1300, thereby receiving data from the access point (step 1327).

The above description with reference to FIG. 13 has shown the operation modes of the traffic state 219. Hereinafter, a mode change process from the active mode 1300 into the hold mode 1360 in the traffic state 219, which is performed upon request from the access point, will be described with reference to FIG. 14.

Figure 14:
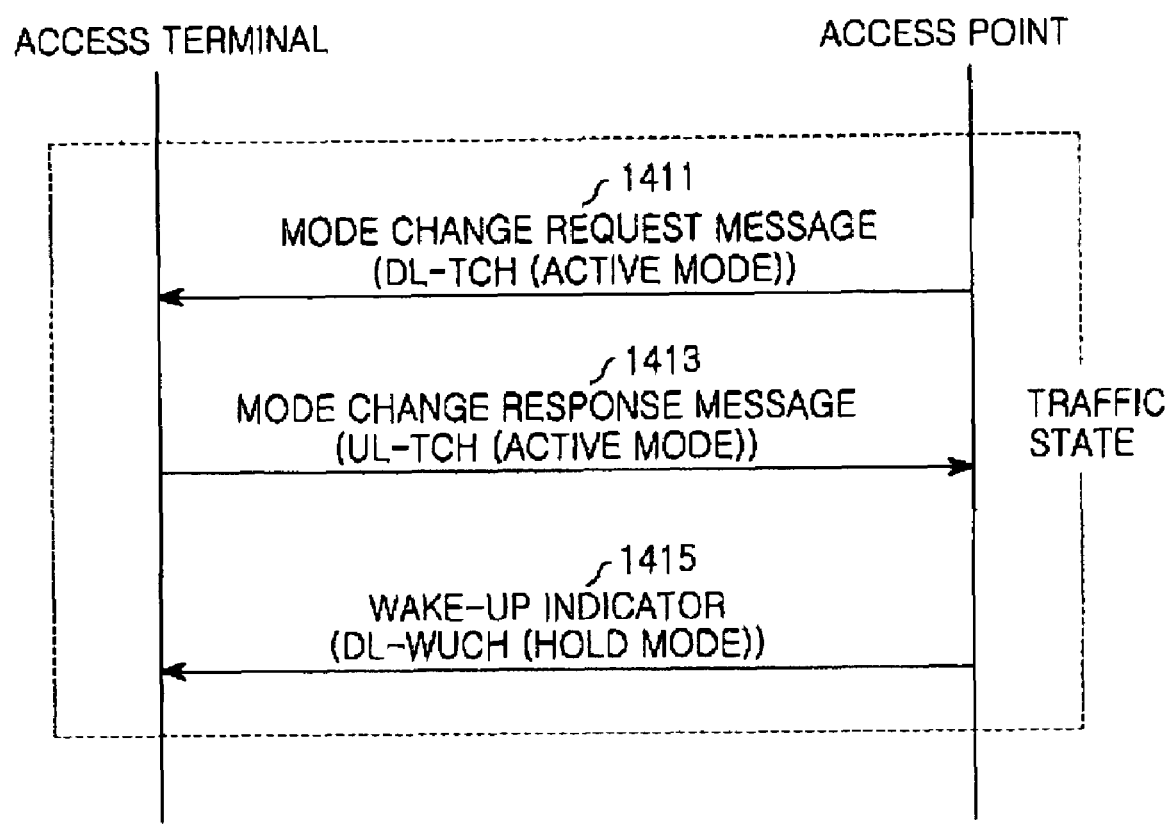
FIG. 14 is a signal flowchart illustrating a message transmitting/receiving process for a mode change from an active mode 1300 into a hold mode, which is performed upon request from an access point and is shown in FIG. 13.

FIG. 14 is a signal flowchart illustrating a message transmitting/receiving process for a mode change from the active mode 1300 into the hold mode 1360, which is performed upon request from the access point and is shown in FIG. 13. Referring to FIG. 14, first, when the access point determines that the access terminal has to perform a mode change from the active mode 1300 into the hold mode 1360, the access point transmits a mode change request message to the access terminal through a DL-TCH (step 1411). In this case, the access point may transmit the fast access PN code information or the fast access time slot information, which the access terminal uses in the fast access mode 1330, through the mode change request message. That is, when the access terminal being in the hold mode 1360 has to transmit data to the access point, it is reasonable that the access terminal does not perform the uplink access of a contention-based scheme but performs the uplink access of a contention-free scheme, so that the access point causes the fast access PN code information or the fast access time slot information, which the access terminal uses in the fast access mode 1330, to be included in the mode change request message. Here, the reason why the access point transmits the fast access PN code information or the fast access time slot information is that the access terminal does not monitor the DL-BCCH in the hold mode 1360.

When the access terminal receives the mode change request message through the DL-TCH in the active mode 1300, the access terminal transmits a mode change response message, which is a response message to the mode change request message, to the access point through an UL-TCH. Also, after transmitting the mode change response message, the access terminal performs a mode change from the active mode 1300 into the hold mode 1360 (step 1413). In the hold mode 1360, the access terminal monitors a DL-WUCH, and periodically checks whether a wake-up indicator is turned on or off (step 1415).

The above description with reference to FIG. 14 has shown the mode change process from the active mode 1300 into the hold mode 1360 in the traffic state 219, which is performed upon the request from the access point. Hereinafter, a mode change process from the hold mode 1360 into the active mode 1300 in the traffic state 219, which is performed upon request from the access terminal, will be described with reference to FIG. 15.

Figure 15:
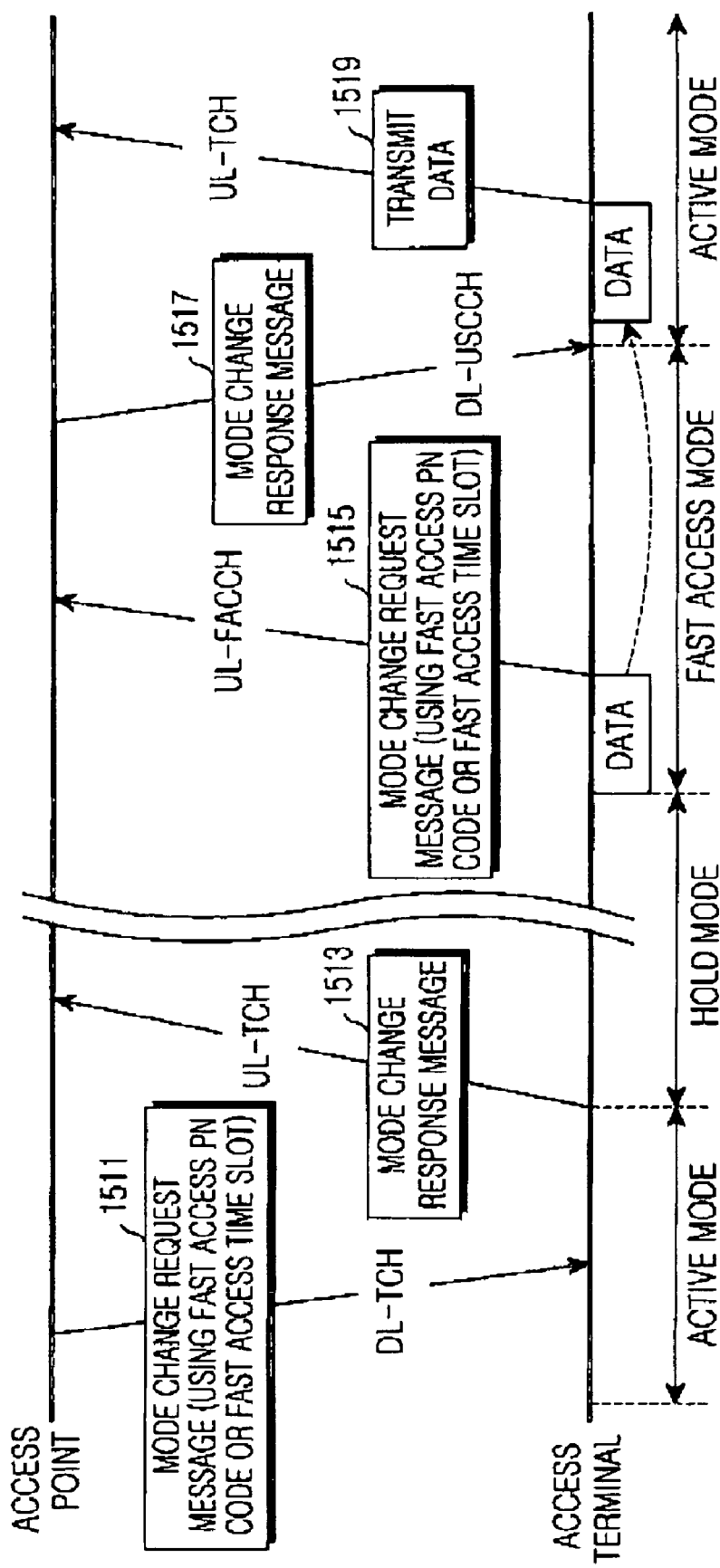
FIG. 15 is a signal flowchart illustrating a mode change process from a hold mode into an active mode, which is performed upon request from an access terminal and is shown in FIG. 13.

FIG. 15 is a signal flowchart illustrating a mode change process from the hold mode 1360 into the active mode 1300, which is performed upon request from the access terminal and is shown in FIG. 13. First, as described with reference to FIG. 14, the access terminal performs a mode change from the active mode 1300 into the hold mode 1360 according to a request generated from the access point (steps 1511 and 1513). Next, when the access terminal, which is in the hold mode 1360, senses that data to be transmitted to the access point is generated, the access terminal performs a mode change from the hold mode 1360 into the fast access mode 1330. After this, in the fast access mode 1330, the access terminal transmits a mode change request message to the access point through a UL-FACCH, using a fast access PN code allocated from the access point in the active mode 1300 (step 1515). When the access point receives the mode change request message from the access terminal through the UL-FACCH, the access point allocates a resource to the access terminal, and transmits a mode change response message, which includes the allocated resource information, to the access terminal through a DL-USCCH (step 1517).

Here, 'resource' means either an uplink bandwidth or a fast access PN code or a fast access time slot. When the access point can allocate an uplink bandwidth to an access terminal, the uplink bandwidth becomes the 'resource'. In contrast, as described above, when the access point cannot allocate an uplink bandwidth to an access terminal because having no currently available uplink bandwidth, the fast access PN code or the fast access time slot becomes the 'resource'. Meanwhile, while the above description is given for the case in which the access terminal receives a mode change response message in response to a mode change request message, the access terminal may judges that the access terminal receives the mode change response message also in a case in which the access terminal receives not the mode change response message itself but only the DL-USCCH. When it is assumed that resource information included in the mode change response message is uplink bandwidth information in FIG. 15, the access terminal performs a mode change from the fast access mode 1330 into the active mode 1300, and transmits the data through a UL-TCH using the allocated uplink bandwidth (step 1519).

The above description with reference to FIG. 15 has shown the mode change process from the hold mode 1360 into the active mode 1300 in the traffic state 219, which is performed upon request from the access terminal. Hereinafter, a mode change process from the active mode 1300 into the hold mode 1360 in the traffic state 219, which is performed upon request from the access terminal, will be described with reference to FIG. 16.

Figure 16:
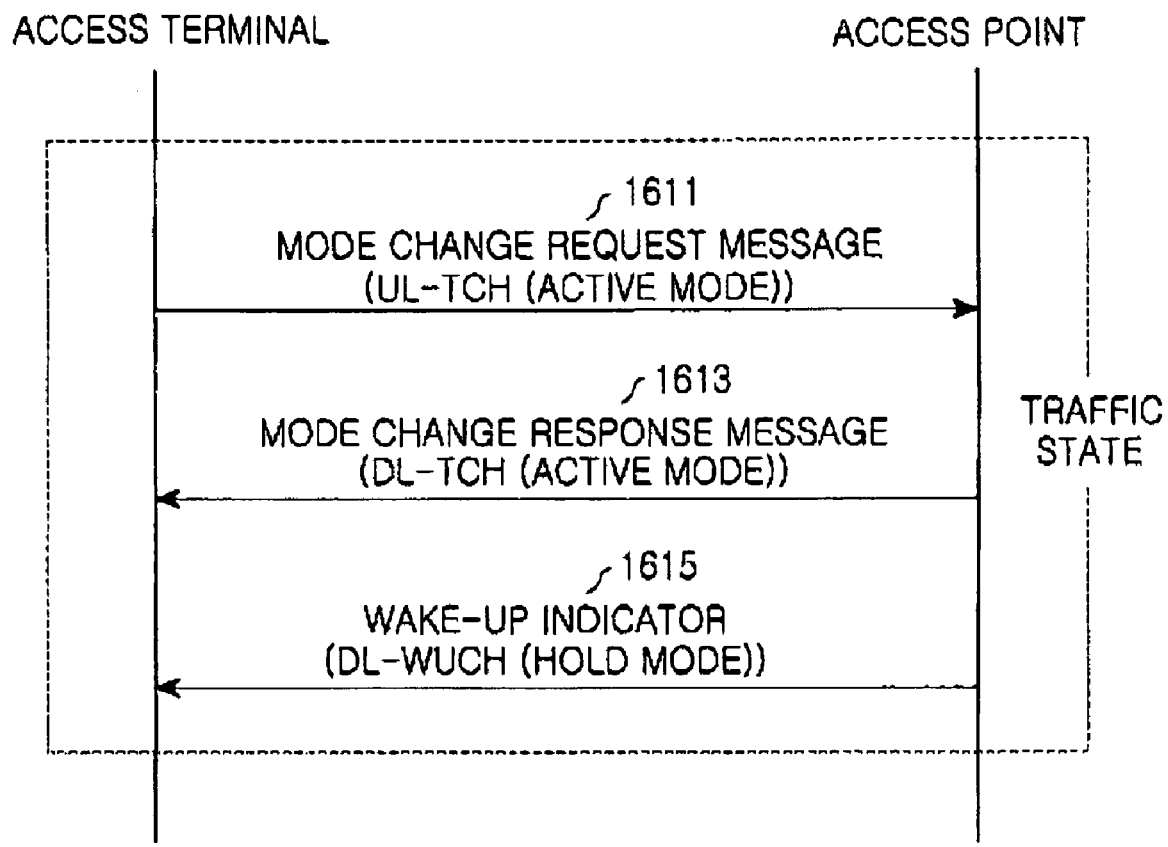
FIG. 16 is a signal flowchart illustrating a message transmitting/receiving process for a mode change from an active mode 1300 into a hold mode, which is performed upon request from an access terminal and is shown in FIG. 13.

FIG. 16 is a signal flowchart illustrating a message transmitting/receiving process for a mode change from the active mode 1300 into the hold mode 1360, which is performed upon the request from the access terminal and is shown in FIG. 13. Referring to FIG. 16, first, when the access terminal determines to perform a mode change from the active mode 1300 into the hold mode 1360, the access terminal transmits a mode change request message to the access point through a UL-TCH (step 1611). When the access point receives the mode change request message through the UL-TCH from the access terminal, the access point causes the fast access PN code information or the fast access time slot information, which the access terminal uses in the fast access mode 1330, to be included in a mode change response message which is a response message to the mode change request message, thereby transmitting the fast access PN code information or the fast access time slot information to the access terminal through an DL-TCH (step 1613). The reason why the access point transmits the fast access PN code information or the fast access time slot information to the access terminal is that the access terminal does not perform normal uplink access of a contention-based scheme, but performs fast uplink access of a contention-free scheme when the access terminal in the hold mode 1360 has to transmit data to the access point. Therefore, the access point transmits the fast access PN code information or the fast access time slot information through the mode change response message. Also, the reason the access point transmits the fast access PN code information or the fast access time slot information is that the access terminal does not monitor the DL-BCCH in the hold mode 1360.

When the access terminal receives the mode change response message through the DL-TCH in the active mode 1300, the access terminal performs a mode change from the active mode 1300 into the hold mode 1360. After this, in the hold mode 1360, the access terminal monitors a DL-WUCH, and periodically determines whether a wake-up indicator is turned on or off (step 1615).

The above description with reference to FIG. 16 has shown the mode change process from the active mode 1300 into the hold mode 1360 in the traffic state 219, which is performed upon request from the access terminal. Hereinafter, a mode change process from the hold mode 1360 into the active mode 1300 in the traffic state 219, which is performed upon request from the access point, will be described with reference to FIG. 17.

Figure 17:
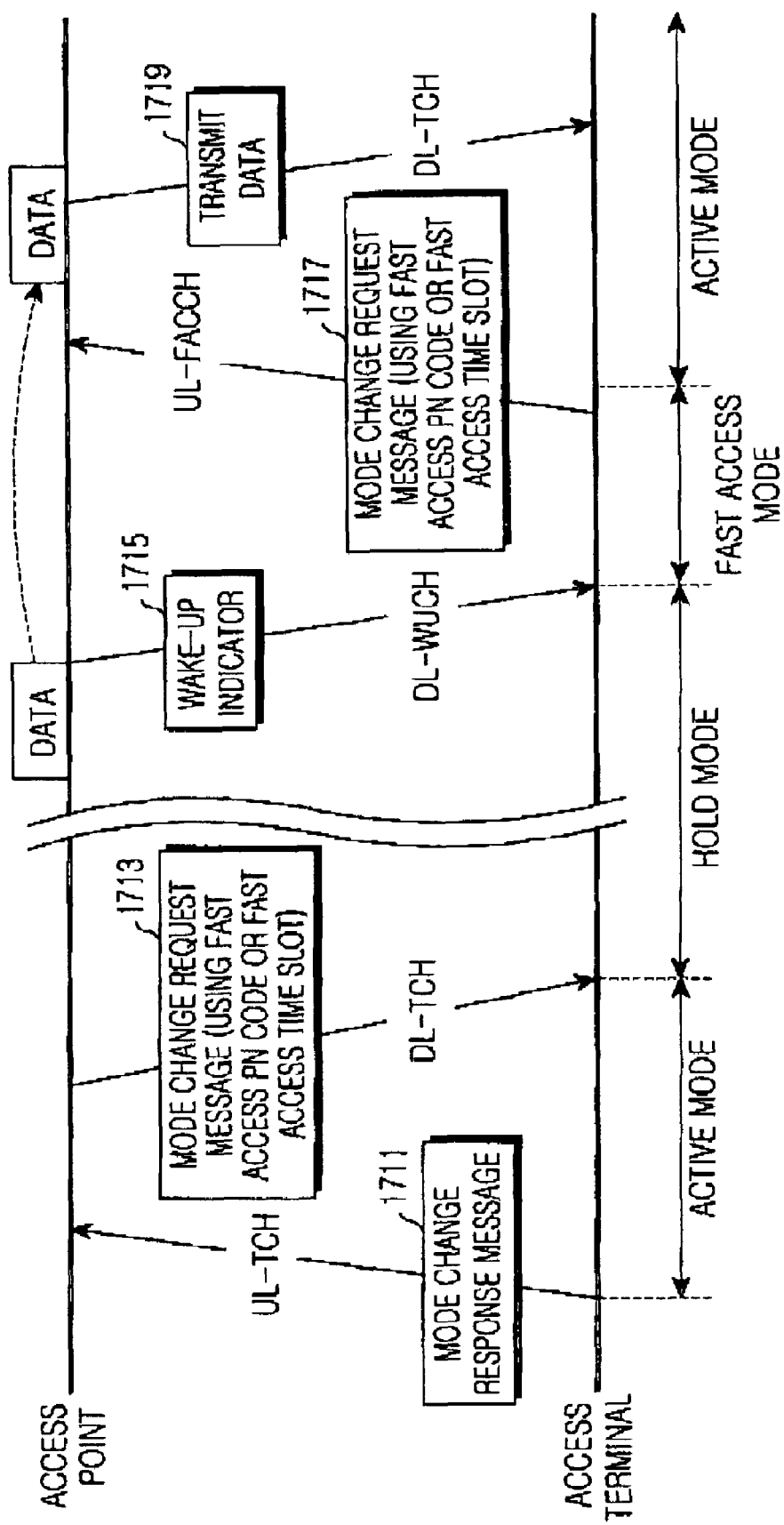
FIG. 17 is a signal flowchart illustrating a mode change process from a hold mode into an active mode, which is performed upon request from an access point and is shown in FIG. 13.

FIG. 17 is a signal flowchart illustrating a mode change process from the hold mode 1360 into the active mode 1300, which is performed upon the request from the access point and is shown in FIG. 13. First, as described with reference to FIG. 16, the access terminal performs a mode change from the active mode 1300 into the hold mode 1360 according to a request generated from the access terminal (steps 1711 and 1713). Next, when the access point senses that data to be transmitted to the access terminal which is in the hold mode 1360 is generated, the access point sets a wake-up indicator corresponding to the access terminal to 'on', and transmits a DL-WUCH to the access terminal (step 1715). The access terminal receives the DL-WUCH including the corresponding wake-up indicator which is set to 'on', and performs a mode change from the hold mode 1360 into the fast access mode 1330. After this, in the fast access mode 1330, the access terminal transmits a mode change response message to the access point through a UL-FACCH, using a fast access PN code or a fast access time slot which is allocated from the access point in the active mode 1300 (step 1717). When the access point receives the mode change response message from the access terminal through the UL-FACCH, the access point transmits the data to the access terminal through a DL-TCH (step 1719). While the above description is given for the case in which the access terminal performs a mode change from the hold mode 1360 into the fast access mode 1330 when receiving a DL-WUCH in which a corresponding wake-up indicator is set to 'on', and transmits a mode change response message, it will be understood that the access terminal may perform a mode change from the hold mode 1360 into the active mode 1300 when receiving a DL-WUCH in which a corresponding wake-up indicator is set to 'on', and transmit the data directly to the access point.

The above description with reference to FIG. 17 has shown the mode change process from the hold mode 1360 into the active mode 1300, which is performed upon request from the access point and is shown in FIG. 13. Hereinafter, a message transmitting/receiving process for a mode change process from the hold mode 1360 into the active mode 1300, which is performed upon request from the access point, will be described with reference to FIG. 18.

Figure 18:
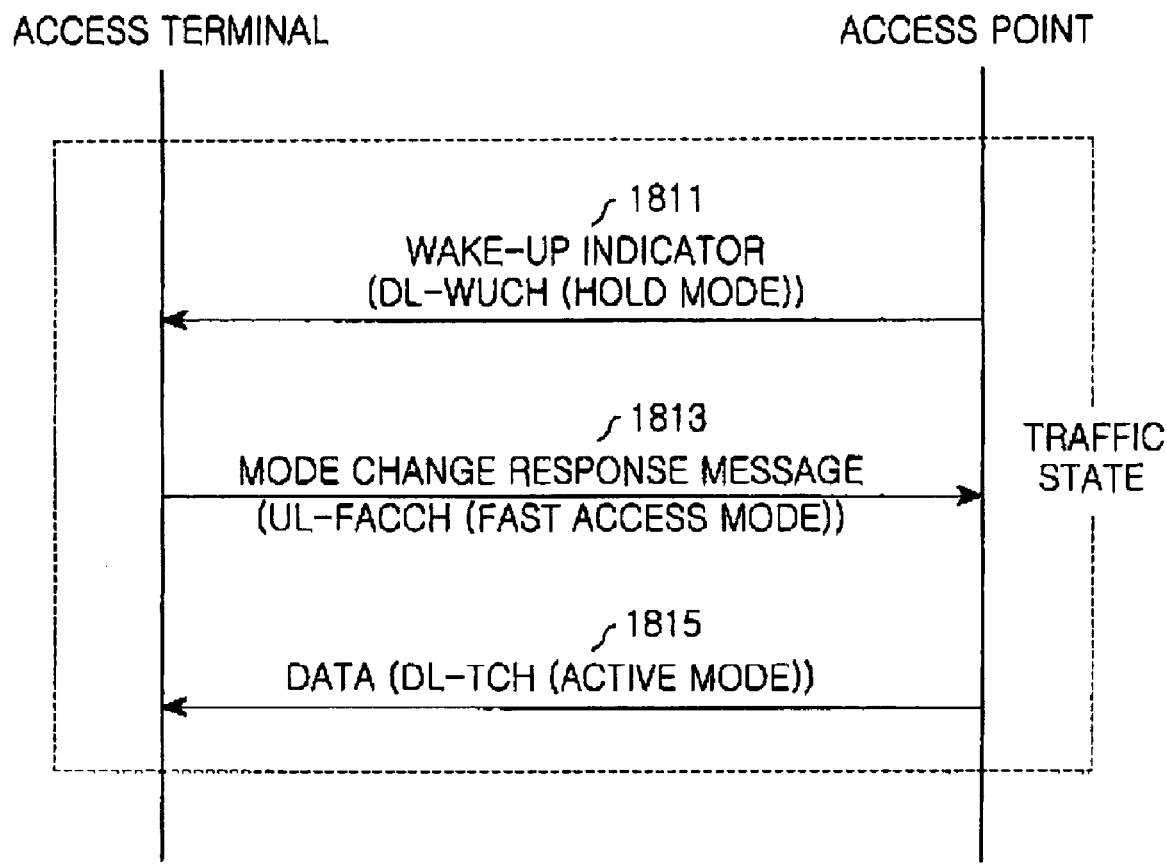
FIG. 18 is a signal flowchart illustrating a message transmitting/receiving process for a mode change process from a hold mode into an active mode, which is performed upon request from an access point and is shown in FIG. 13.

FIG. 18 is a signal flowchart illustrating a message transmitting/receiving process for a mode change process from the hold mode 1360 into the active mode 1300, which is performed upon request from the access point and is shown in FIG. 13. Referring to FIG. 18, first, as described with reference to FIG. 17, when the access point senses that data to be transmitted to the access terminal which is in the hold mode 1360 is generated, the access point sets a wake-up indicator corresponding to the access terminal to 'on', and transmits a DL-WUCH to the access terminal (step 1811). The access terminal receives the DL-WUCH including the corresponding wake-up indicator which is set to 'on', and performs a mode change from the hold mode 1360 into the fast access mode 1330. After this, in the fast access mode 1330, the access terminal transmits a mode change response message to the access point through a UL-FACCH, using a fast access PN code or a fast access time slot which is allocated from the access point in the active mode 1300. Next, the access terminal performs a mode change from the fast access mode 1330 into the active mode 1300 (step 1813). Then, the access point receives the mode change response message from the access terminal through the UL-FACCH, and transmits the data to the access terminal through a DL-TCH (step 1815). While the above description is given for the case in which the access terminal performs a mode change from the hold mode 1360 into the fast access mode 1330 when receiving a DL-WUCH in which a corresponding wake-up indicator is set to 'on', and transmits a mode change response message, it will be understood that the access terminal may perform a mode change from the hold mode 1360 into the active mode 1300 when receiving a DL-WUCH in which a corresponding wake-up indicator is set to 'on', and transmit data directly to the access point.

The above description with reference to FIG. 18 has shown the message transmitting/receiving process for a mode change process from the hold mode 1360 into the active mode 1300, which is performed upon request from the access point and is shown in FIG. 13. Hereinafter, a message transmitting/receiving process for a mode change process from the hold mode 1360 into the active mode 1300, which is performed upon request from the access terminal, will be described with reference to FIG. 19.

Figure 19:
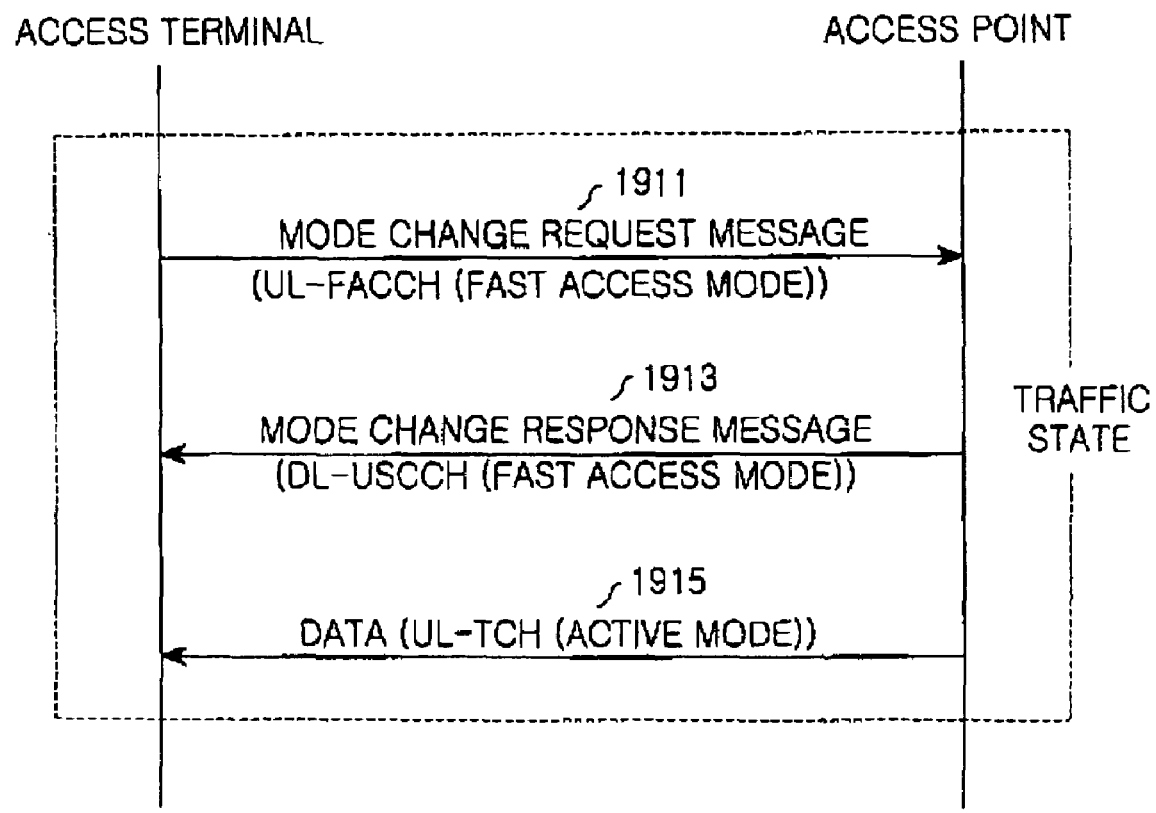
FIG. 19 is a signal flowchart illustrating a message transmitting/receiving process for a mode change process from a hold mode into an active mode, which is performed upon request from an access terminal and is shown in FIG. 13.

FIG. 19 is a signal flowchart illustrating a message transmitting/receiving process for a mode change process from the hold mode 1360 into the active mode 1300, which is performed upon request from the access terminal and is shown in FIG. 13. Referring to FIG. 19, as described with reference to FIG. 13, when the access terminal, which is in the hold mode 1360, senses that data to be transmitted to the access point are generated, the access terminal performs a mode change from the hold mode 1360 into the fast access mode 1330. After this, in the fast access mode 1330, the access terminal transmits a mode change request message to the access point through a UL-FACCH, using a fast access PN code or a fast access time slot allocated from the access point in the active mode 1300 (step 1911). When the access point receives the mode change request message from the access terminal through the UL-FACCH, the access point allocates a resource to the access terminal, and transmits a mode change response message, which includes the allocated resource information, to the access terminal through a DL-USCCH (step 1913).

Here, 'resource' means either an uplink bandwidth or a fast access PN code or a fast access time slot. When the access point can allocate an uplink bandwidth to an access terminal, the uplink bandwidth becomes the 'resource'. In contrast, as described above, when the access point cannot allocate an uplink bandwidth to an access terminal because there is no currently available uplink bandwidth, the fast access PN code or the fast access time slot becomes the 'resource'. Meanwhile, while the above description is given for the case in which the access terminal receives a mode change response message in response to a mode change request message, the access terminal may determines that the access terminal receives the mode change response message also in a case in which the access terminal receives not the mode change response message itself but only the DL-USCCH. When it is assumed that resource information included in the mode change response message is uplink bandwidth information in FIG. 19, the access terminal performs a mode change from the fast access mode 1330 into the active mode 1300, and transmits the data through a UL-TCH using the allocated uplink bandwidth (step 1915).

As described above, an apparatus and a method according to the present invention provides new operational states of a MAC layer suitable to a broadband wireless access communication system, thereby having an advantage in that it is possible to support the fast data transmission and the mobility of an access terminal. In addition, an apparatus and a method according to the present invention, that provide new operational states of a MAC layer suitable to a broadband wireless access communication system, has an advantage in that an access terminal can achieve the fast access while minimizing the power consumption. In addition, an apparatus and a method according to the present invention, that provide new operational states of a MAC layer suitable to a broadband wireless access communication system, has an advantage in that it is possible to minimize the power consumption of an access terminal when the data transmission/reception is temporarily interrupted while it is possible maximize the data transmission efficiency by performing the fast access when the data transmission/reception is resumed.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of an access terminal for controlling an operational state of a medium access control layer in a broadband wireless access communication system, the method comprising the steps of:

performing an uplink access of a contention-based scheme to an access point using resources required to perform the uplink access according to the contention-based scheme when data to be transmitted is detected in an access state;

receiving resources required to perform an uplink access of a contention-free scheme from the access point in a case of failing to be allocated a bandwidth by the access point after the access point receives the uplink access of the contention-based scheme; and performing a state transition from the access state into a traffic state in a case of receiving the resources required to perform the uplink access of the contention-free scheme, and performing the uplink access of the contention-free scheme to the access point using the received resources in the traffic state.

2. The method as claimed in claim 1, further comprising a step of transmitting the data to the access point when the uplink access of the contention-free scheme is succeeded.

3. The method as claimed in claim 1, wherein the resources required to perform the uplink access of the contention-based scheme are determined according to QoS (Quality of Service) classes of the data.

4. The method as claimed in claim 3, wherein, the resources required to perform the uplink access of the contention-based scheme includes codes classified according to the QoS classes, and the higher the priority of the QoS class, the more the codes are classified into the QoS class.

5. The method as claimed in claim 1, wherein the resources required to perform the uplink access of the contention-free scheme is allocated when the data has a QoS (Quality of Service) class greater than or equal to a predetermined priority.

6. The method as claimed in claim 1, wherein the resources required to perform the uplink access of the contention-free scheme include time slots.

7. A method for controlling an operational state of a medium access control layer in a broadband wireless access communication system, the medium access control layer having a null state for performing an initial operation following a reset, an initialization state for acquiring synchronization with an access point and performing a network entry operation to the access point, a sleeping state for performing a wake-up operation by a control of the access point or when there is data to be transmitted to the access point, an access state for performing an uplink access of a contention-free scheme to the access point, and a traffic state for transmitting data to the access point or receiving data from the access point, the method comprising the steps of:

allocating codes by the access point for uplink access of a contention-based scheme and allocating codes by the access point for the uplink access of the contention-free scheme according to QoS (Quality of Service) classes;

selecting a first code by an access terminal, according to the QoS classes of data to be transmitted from among the allocated codes for the uplink access of the contention-based scheme, when the data to be transmitted through an uplink in the access state is generated, and performing an uplink access of the contention-based scheme to the access point using the first code;

allocating by the access point a second code, from among the codes for uplink access of the contention-free scheme, to the access terminal so that the access terminal can perform an uplink access of the contention-free scheme, when it fails to allocate the access terminal a resource for data transmission of the access terminal in response to the uplink access performed by the access terminal; and performing by the access terminal a state transition from the access state into the traffic state when allocated the second code, and performing an uplink access of the contention-free scheme to the access point using the second code in the traffic state.

8. The method as claimed in claim 7, further comprising a step of transmitting the data to the access point when the uplink access of the contention-free scheme is succeeded after performing the uplink access of the contention-free scheme.

9. The method as claimed in claim 7, wherein the second code is allocated when the data has a QoS class is equal to or greater than a predetermined reference priority.

10. The method as claimed in claim 7, wherein the higher the priority of the QoS class, the more the codes are classified to the QoS class are.

11. A method for controlling an operational state of a medium access control layer in a broadband wireless access communication system, the method comprising of the steps of:

acquiring synchronization with an access point to which an access terminal belongs in a system detecting mode of an initialization state, performing a mode change from the system detecting mode into a network entry mode, and performing a network entry operation to the access point in the network entry mode;

entering a sleeping mode of a sleeping state from the network entry mode when there is no data to be transmitted to the access point or received from the access point, entering an access state from the network entry mode when there is data to be transmitted to the access point, and entering a traffic state from the network entry mode when there is data to be received from the access point, after performing the network entry operation;

entering an awake mode of the sleeping state when there is data to be transmitted to the access point or when a wake-up is requested from the access point in the sleeping state, and entering the access state from the awake mode when there is data to be transmitted to the access point; and receiving predetermined information from the access point in the awake mode, and entering either the sleeping mode or the traffic state from the awake mode according to the predetermined information.

12. The method as claimed in claim 11, wherein, the step of performing the network entry operation to the access point comprises the steps of:

transmitting a network entry request message to the access point through an access channel corresponding to predetermined uplink access information; and receiving a network entry response message from the access point in response to the network entry request message, the network entry response message including slot index information of a wake-up channel which the access terminal monitors to detect whether a wake-up request is generated from the access point in the sleeping mode.

13. The method as claimed in claim 12, further comprising a step of monitoring only the wake-up channel in the sleeping mode.

14. The method as claimed in claim 12, wherein a slot index of the wake-up channel, which the access terminal monitors, is determined as a particular value in the access point and is continuously maintained in the access point.

15. A method for controlling an operational state of a medium access control layer in a broadband wireless access communication system, the method comprising the steps of:

transmitting by an access point a pilot channel signal and a broadcast channel signal, the pilot channel signal being used for synchronization acquisition with an access terminal, the broadcast channel signal including system information of the broadband wireless access communication system;

acquiring by the access terminal synchronization with the access point, to which the access terminal itself belongs, using the pilot channel signal in a system detecting mode of an initialization state, and entering a network entry mode;

receiving by the access terminal the broadcast channel signal and transmitting a network entry request message to the access point in the network entry mode;

transmitting by the access point a network entry response message to the access terminal in response to the network entry request message, the network entry response message including slot index information of a wake-up channel which the access terminal monitors in the sleeping mode of the sleeping state; and receiving by the access terminal the network entry response message, and entering the sleeping mode when there is no data to be transmitted to the access point or received from the access point, thereby monitoring a wake-up indicator of the wake-up channel corresponding to the slot index information.

16. The method as claimed in claim 15, further comprising the steps of:

setting by the access point a wake-up indicator corresponding to the slot index information to 'on' and transmitting the wake-up channel signal, when there is data to be transmitted to the access point or when the system information is updated, after transmitting the network entry response message;

entering by the access terminal an awake mode of the sleeping state from the sleeping mode when the wake-up indicator of the wake-up channel corresponding to the slot index information is set to 'on';

transmitting by the access point the broadcast channel signal which includes paging information representing the updated system information or representing that there are data to be transmitted to the access terminal; and receiving by the access terminal the broadcast channel signal, entering the sleeping mode after applying the updated system information when the broadcast channel signal includes the updated system information, and entering an traffic state when the broadcast channel signal includes the paging information.

17. The method as claimed in claim 15, further comprising the steps of:

setting by the access point a wake-up indicator corresponding to the slot index information to 'off' and transmitting the wake-up channel signal, when there is no data to be transmitted to the access terminal and when the system information is not updated, after transmitting the network entry response message; and maintaining by the access terminal the sleeping mode when the wake-up indicator of the wake-up channel corresponding to the slot index information is set to 'off'.

18. An apparatus for transmitting a wake-up channel in a broadband wireless access communication system, the apparatus comprising:

a symbol repeater for receiving wake-up indicators, a number of frames constructing a super frame of a wake-up channel, and a frame period, the wake-up indicators representing whether or not access terminals in a sleeping mode of a sleeping state wake up, the wake-up channel including the wake-up indicators, the frame period representing a period in which the wake-up indicators are transmitted in the super frame, and for repeating a symbol of the wake-up indicators according to a transmission format of the wake-up channel;

a wake-up channel information mapper for receiving slot index information according to a predetermined control and on/off setting information of the wake-up indicator, and for setting the wake-up indicators, which exists in slots corresponding to the slot index information, from among signals output from the symbol repeater, according to the on/off setting information; and a controller for determining access terminals to which data or updated system information is transmitted when there is data to be transmitted or when the system information is updated, and for outputting slot index information and first setting information to the wake-up channel information mapper, the slot index information monitored by the determined access terminals, the first information representing that wake-up indicators corresponding to the slot index information have to be set to 'on'.

19. The apparatus as claimed in claim 18, wherein the controller outputs second information, which represents that the wake-up indicators have to be set to 'off', to the wake-up channel information mapper, when there is no data to be transmitted and when the system information is not updated.

20. The apparatus as claimed in claim 19, further comprising a channel gain multiplier which multiplies a signal output from the wake-up channel information mapper by a predetermined channel gain, and outputs the resultant.

21. A method for transmitting a wake-up channel in a broadband wireless access communication system, the method comprising the steps of:

receiving wake-up indicators, a number of frames constructing a super frame of a wake-up channel, and a frame period, the wake-up indicators representing whether or not access terminals in a sleeping mode of a sleeping state wake up, the wake-up channel including the wake-up indicators, the frame period representing a period in which the wake-up indicators are transmitted in the super frame, and repeating a symbol of the wake-up indicators according to a transmission format of the wake-up channel;

determining access terminals to which data or updated system information is transmitted when there is the data to be transmitted or when the system information is updated, and determining slot index information which the determined access terminals monitor; and setting wake-up indicators corresponding to the determined slot index information to 'on', and transmitting the wake-up channel signal.

22. The method as claimed in claim 21, further comprising a step of setting the wake-up indicators to 'off,' when there is no data to be transmitted and when the system information is not updated, and transmitting the wake-up channel signal.

23. A method for controlling an operational state of a medium access control layer in a broadband wireless access communication system, the method comprising the steps of:

entering an active mode of a traffic state, when there is data to be received from an access point in one of an initialization state and in a sleeping state, or when an uplink bandwidth is allocated according to uplink access performance of a contention-based scheme in an access state;

entering a hold mode when data transmission to the access point or data reception from the access point is interrupted for a predetermined period of time during data transmission to the access point or data reception from the access point while in an active mode;

receiving a predetermined channel signal in the hold mode so as to monitor whether or not a wake-up request is generated from the access point, entering the active mode when a wake-up request is generated from the access point, and entering the fast access mode when data to be transmitted to the access point is generated in the hold mode; and performing an uplink access of a contention-free scheme to the access point in the fast access mode using resources for the uplink access of the contention-free scheme, and entering the active mode when being allocated the uplink bandwidth as a result of the uplink access performance of the contention-free scheme.

24. The method as claimed in claim 23, further comprising the step of entering the fast access mode of the traffic state, when being allocated resources for the uplink access of the contention-free scheme during the uplink access of the contention-based scheme while in the access state.

25. The method as claimed in claim 23, wherein a resource for the uplink access of the contention-free scheme includes a code and a time slot, which are used when the uplink access of the contention-free scheme is performed in the fast access mode, which are different from a code and a time slot used when an uplink access of the contention-based scheme is performed.

26. The method as claimed in claim 23, further comprising the step of maintaining the active mode although data transmission or data reception is interrupted during a predetermined period of time, when a QoS (Quality of Service) class of data to be transmitted to the access point or received from the access point in the active mode is equal to or greater than a predetermined reference priority.

27. The method as claimed in claim 23, wherein the set channel includes a wake-up channel.

28. A method for controlling an operational state of a traffic state in a broadband wireless access communication system, the method comprising the steps of:
  1) transmitting data to an access point or receiving data from an access point by an access terminal in an active mode;
  2) requesting the access terminal to perform a mode change from the active mode into a hold mode by the access point, when the data transmission to the access terminal or data reception from the access terminal, which is in the active mode, is interrupted during a predetermined period of time;
  3) entering the hold mode by the access terminal after transmitting a response to the access point in response to the mode change request of step 2), receiving a set channel signal, which is monitored to determine if a wake-up request is generated from the access point, entering the active mode when a wake-up request is generated from the access point, and entering a fast access mode when data to be transmitted to the access point are generated in the hold mode;
  4) requesting by the access terminal in the fast access mode that a mode of the access terminal is changed from the fast access mode into active mode using a resource for uplink access of a contention-free scheme; and
  5) transmitting a response to the access terminal by the access point in response to a mode change request of step 4), thereby causing the access terminal to perform a mode change from the fast access mode into the active mode and to transmit the data to the access point.

29. The method as claimed in claim 28, wherein step 2) comprises the steps of:
  determining by the access point that a mode of the access terminal is changed from the active mode into the hold mode, when the data transmission to the access terminal or data reception from the access terminal, which is in the active mode, is interrupted during a predetermined period of time; and
  determining by the access point a resource for uplink access of the contention-free scheme, which the access terminal uses in the fast access mode, after determining the mode change, and requesting the access terminal to perform a mode change from the active mode into the hold mode through transmission of a signal including the determined resource for uplink access of the contention-free scheme.

30. The method as claimed in claim 29, wherein in step 4) the access terminal requests that a mode of the access terminal has to be changed from the fast access mode into an active mode, using resources for an uplink access of the contention-free scheme which is received in the active mode before entering the hold mode.

31. The method as claimed in claim 30, wherein the resources for the uplink access of the contention-free scheme includes a code and a time slot used when uplink access of the contention-free scheme is performed in the fast access mode.

32. The method as claimed in claim 28 wherein the set channel includes a wake-up channel.

33. The method as claimed in claim 28, wherein a mode change request of step 2) is transmitted through a downlink traffic channel, the response to the mode change request of step 2) is transmitted through an uplink traffic channel, a mode change request of step 4) is transmitted through a fast access channel, and the response to the mode change request of step 4) is transmitted through a scheduling channel.

34. A method for controlling an operational state of a traffic state in a broadband wireless access communication system, the method comprising the steps of:
  1) requesting by an access terminal an access point that a mode of the access terminal itself is changed from an active mode into a hold mode when data transmission or data reception is interrupted for a predetermined period of time during the data transmission/reception to/from the access point while in the active mode;
  2) transmitting by the access point a response to a mode change request of step 1) to the access terminal, thereby causing the access terminal to enter the hold mode;
  3) requesting by the access point the access terminal to change a mode of the access terminal from the hold mode into the active mode when detecting that data to be transmitted to the access terminal being in the hold mode are generated; and
  4) performing by the access terminal a mode change from the hold mode into the active mode according to a mode change request of step 3), thereby receiving the data from access point.

35. The method as claimed in claim 34, further comprising step 5) of performing by the access terminal a mode change from the hold mode into the active mode according to the mode change request of step 3) and transmitting a response to the mode change request of step 3).

36. The method as claimed in claim 35, wherein in step 2), the access point detects a mode change request of step 1), determines a resource for uplink access of a contention-free scheme which the access terminal uses in the fast access mode, and transmits a response, which includes the determined resource for uplink access of the contention-free scheme, to the access terminal in response to the mode change request of step 1).

37. The method as claimed in claim 36 wherein, in step 5) the access terminal transmits a response to the mode change request of step 3) to the access point, using a resource for uplink access of the contention-free scheme received in the active mode before the access terminal enters the hold mode.

38. The method as claimed in claim 37, wherein the resource for uplink access of the contention-free scheme includes a code and a time slot used when uplink access of the contention-free scheme is performed in the fast access mode.

39. The method as claimed in claim 38, wherein, the mode change request of step 1) is transmitted through an up link traffic channel, the response to the mode change request of step 1) is transmitted through a downlink traffic channel, the mode change request of step 3) is transmitted through a wake-up channel, and the response to the mode change request of step 3) is transmitted through a fast access channel.

* * * * *